United States Patent [19]

Christie, Jr. et al.

[11] Patent Number: 5,682,096
[45] Date of Patent: Oct. 28, 1997

[54] METHOD AND APPARATUS FOR MONITORING OPERATING POSITIONS OF A MEDIA AUTOCHANGER

[75] Inventors: Leslie Christie, Jr., Greeley; Thomas E. Berg, Colorado Springs; Gregg S. Schmidtke, Fort Collins, all of Colo.

[73] Assignee: Hewlett-Packard Company, Palo Alto, Calif.

[21] Appl. No.: 386,991

[22] Filed: Jan. 5, 1995

[51] Int. Cl.$^6$ .................. G01B 7/14; G11B 17/22; G11B 17/04; G11B 17/08
[52] U.S. Cl. .................. 324/207.2; 324/226; 369/30; 369/36; 369/200
[58] Field of Search .................. 324/207.2, 252, 324/207.22, 226, 262; 369/199, 200, 30, 36, 38

[56] References Cited

U.S. PATENT DOCUMENTS

| | | | |
|---|---|---|---|
| 4,392,375 | 7/1983 | Eguchi et al. | 324/207.21 |
| 4,815,056 | 3/1989 | Toi et al. | 369/36 |
| 4,966,041 | 10/1990 | Miyazaki | 324/207.2 |
| 4,998,232 | 3/1991 | Methlie et al. | |
| 5,010,536 | 4/1991 | Wanger et al. | |
| 5,014,255 | 5/1991 | Wanger et al. | |
| 5,036,503 | 7/1991 | Tomita | 369/39 |
| 5,040,159 | 8/1991 | Oliver et al. | |
| 5,043,962 | 8/1991 | Wanger et al. | |
| 5,062,093 | 10/1991 | Christie et al. | |
| 5,101,387 | 3/1992 | Wanger et al. | |
| 5,184,336 | 2/1993 | Wanger et al. | |
| 5,345,431 | 9/1994 | Oliver et al. | |

Primary Examiner—Walter E. Snow

[57] ABSTRACT

A monitor assembly for a media autochanger having a media holder assembly which is rotatable with respect to a media autochanger support frame about a media holder rotation axis. The media holder assembly includes first and second media engaging members. The monitor assembly includes first indicia located on the first media engaging member, second indicia located on the second media engaging member and an indicia sensor mounted on the support frame. The monitor assembly determines the angular orientation of the media holder assembly and whether an adjacent media engaging member is in a linear registration position by analyzing the indicia sensor signal.

11 Claims, 18 Drawing Sheets

METHOD AND APPARATUS FOR MONITORING OPERATING POSITIONS OF A MEDIA AUTOCHANGER

FIELD OF THE INVENTION

The present invention relates generally to media auto changers, i.e. systems for handling and storing data recording media such as magnetic disk, optical disk and tape cartridges and, more particularly, to a flip-latch assembly for a media autochanger of the type having a media holder assembly which is rotatable about a media holder flip axis.

BACKGROUND OF THE INVENTION

The use of magnetic disks for the storage of computer readable data is well known in the art. Magnetic disks may be fixed in a drive or may be removable. An optical disk is a data storage medium which is readable by a laser-based reading device. Optical disks such as "compact disks" ("CDs") are commonly used for storing musical and audio-visual works. Due to the huge storage capacity of optical disks as compared to conventional magnetic storage media, optical disks are also used in the computer industry. One type of optical disk, a magneto-optical disk, can be readily written and erased and is thus becoming increasingly popular to complement or replace conventional magnetic disks ("hard disks" and "floppy disks"). To increase storage capacity, optical disks may have the ability to store data on both sides of the disk.

To facilitate storing and handling of removable optical disks and magnetic disks, the disks are normally mounted in parallelepiped-shaped cartridges. Also used in the computer industry for data storage are parallelepiped-shaped tape cartridges such as Digital Audio Tape (DAT) cartridges and 8-mm tape cartridges.

For large databases consisting of many disk or tape cartridges, it is necessary to provide a system for storing and handling the cartridges. Various features and components of cartridge storing and handling systems, generally referred to in the art are "autochangers", are disclosed in U.S. Pat. No. 4,998,232 issued Mar. 5, 1991 for OPTICAL DISK HANDLING APPARATUS WITH FLIP LATCH of Methlie et al. (and corresponding EPO patent application No. 89312226.7 filed Nov. 24, 1989); U.S. Pat. No. 5,014,255 issued May 7, 1991 for OPTICAL DISK CARTRIDGE HANDLING APPARATUS WITH PASSIVE CARTRIDGE ENGAGEMENT ASSEMBLY of Wanger et al. (and corresponding EPO patent application No. 90300988.4 filed Jan. 31, 1990; U.S. Pat. No. 5,010,536 issued Apr. 23, 1991 for CARTRIDGE HANDLING SYSTEM of Wanger et al. (and corresponding EPO patent application No. 90301420.7 filed Feb. 9, 1990; U.S. Pat. No. 5,043,962 issued Aug. 27, 1991 for CARTRIDGE HANDLING SYSTEM of Wanger et al. (and corresponding EPO patent application No. 90302635.9 filed Mar. 13, 1990); U.S. Pat. No. 5,062,093 issued Oct. 29, 1991 for OPTICAL DISK INSERTION APPARATUS of Christie et al. (and corresponding EPO patent application No. 89312461.0 filed Nov. 30, 1989); U.S. Pat. No. 5,101,387 issued Mar. 31, 1992 for LATERAL DISPLACEMENT CONTROL ASSEMBLY FOR AN OPTICAL DISK HANDLING SYSTEM of Wanger et al. (and corresponding EPO patent application No. 90300305.1 filed Jan. 11, 1990); U.S. Pat. No, 5,184,336 issued Feb. 2, 1993 for LATERAL DISPLACEMENT CONTROL ASSEMBLY FOR AN OPTICAL DISK HANDLiNG SYSTEM of Wanger et al.; co-pending U.S. patent application Ser. No. 08/020,160 filed Feb. 18, 1993 for LINEAR DISPLACEMENT AND SUPPORT APPARATUS FOR USE IN A CARTRIDGE HANDLING SYSTEM of Luffel et al., and co-pending U.S. patent application Ser. No. 08/135,607 filed Oct. 12, 1993 for CARTRIDGE HANDLING SYSTEM WITH DUAL CARTRIDGE ENGAGING ASSEMBLY of Rugg et al., which are each hereby specifically incorporated by reference for all that is disclosed therein.

In general, a media autochanger may include a media storage system for storing media such as optical disk cartridges at predetermined storage locations. Such an autochanger may perform such functions as retrieving a desired cartridge from its storage location, transporting the cartridge to a disk or tape drive, and inserting the cartridge into the drive. The media autochanger may also perform the functions of removing a cartridge from a drive, moving the cartridge into alignment with its original or other storage location, and inserting the cartridge in that storage location. It may also be necessary for the autochanger to flip a cartridge before insertion or reinsertion into a drive to reverse the side thereof which is read or written by the drive.

A typical media autochanger may thus comprise a laterally displaceable assembly, a vertically displaceable assembly mounted on the laterally displaceable assembly and a media holder assembly mounted on the vertically displaceable assembly by a support frame. The media holder assembly may be rotatable relative to the support frame about a longitudinally extending flip axis. The media holder assembly typically includes a media engaging member which is longitudinally extendable and retractable from a media holder chassis and which is used to engage and pull media units into the media holder assembly or to push media units out of the media holder assembly.

Some media autochangers such as those described in U.S. patent application Ser. No. 08/135,067 of Rugg et al., incorporated by reference above, have two media engager members in each media holder assembly to increase system performance. The media engager members in such an assembly are each extendable and retractable from different sleeve portions of the media holder chassis. The sleeve portions are positioned in "over-under" relationship on opposite sides of the media holder flip axis. The media engager members may be displaced, one at a time, by the same drive motor. A media engager member which is currently linked to the drive motor is referred to as being "active". A media engager member which is not active is referred to as being "parked". One media engager may be "active" while the other media engager is "parked" or both media engagers may be parked.

A problem encountered by media autochangers with rotatable media holder assemblies is determining which side of the media holder is "up" at any given time, particularly at system start up or after a power failure in which previously stored information telling the controller which side is up may not be available. A further problem, with media autochangers such as described in U.S. patent application Ser. No. 08/135,067 of Rugg et al., is determining which of the media engagers is active and which is parked.

SUMMARY OF THE INVENTION

The present invention is directed to a monitor assembly for a media autochanger having a media holder assembly which is rotatable with respect to a media autochanger support frame about a media holder rotation axis. The media holder assembly includes first and second media engaging members. The monitor assembly includes first indicia located on the first media engaging member, second indicia located on the second media engaging member and an indicia sensor mounted on the support frame. The monitor assembly determines the angular orientation of the media holder assembly, i.e. determines which side is up, and also determines whether an adjacent media engaging member is in a linear registration position, by analyzing the indicia sensor signal.

The monitor assembly may include a second indicia sensor mounted on the support frame which enables both of the media engaging members to be detected simultaneously to determine whether or not each is in its longitudinal registration position.

In one preferred embodiment in which two indicia sensors are employed, each of the sensors is a Hall-effect sensor and each of the indicia are permanent magnets. The polarity of the magnet mounted on the first media engaging member is opposite to the polarity of the magnet mounted on the second media engaging member. The Hall-effect sensor signal provides information as to the polarity of the adjacently positioned magnet as well as its local field strength. Thus the relative proximity of the media engaging member can be determined by analyzing the magnitude of the sensor signal and the identity of the particular media engaging member which is currently positioned near the Hall-effect sensor can be determined by analysis of the signal polarity indicating parameter—typically the sign of the signal.

BRIEF DESCRIPTION OF THE DRAWINGS

An illustrative and presently preferred embodiment of the invention is shown in the accompanying drawings in which.

DETAILED DESCRIPTION OF THE INVENTION

Displacement Monitor in General

Figure 1:
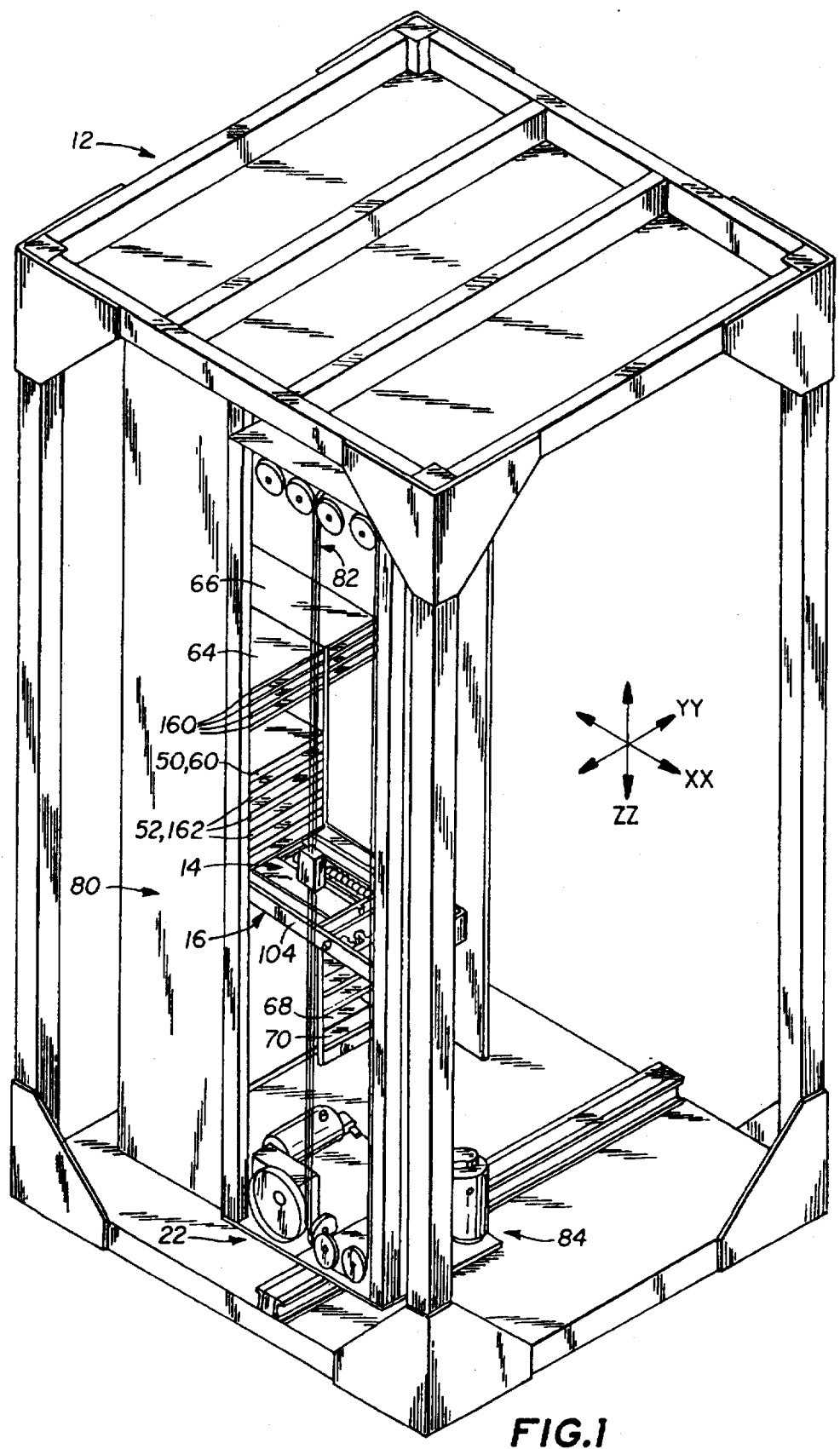
FIG. 1 is a perspective view of a media autochanger with housing panels removed.
Figure 4:
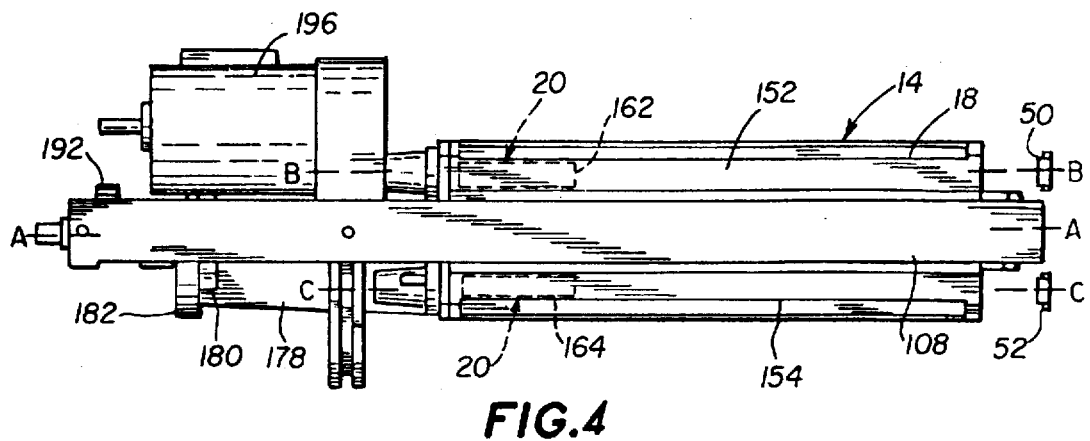
FIG. 4 is a side elevation view of the media holder assembly and associate support frame of FIGS. 2 and 3 showing the media holder in the registration position of FIG. 2.
Figure 18:
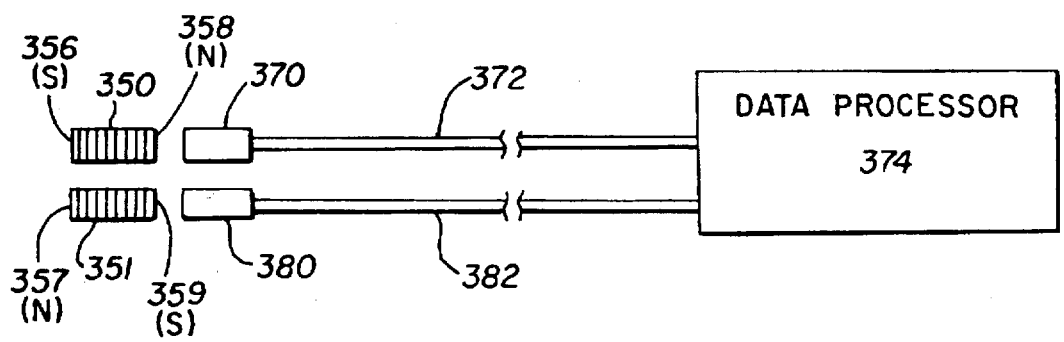
FIG. 18 is a schematic view of two Hall-effect sensors and an associated data processor.

The drawing illustrates a displacement monitor assembly for a media autochanger 12, FIG. 1, having a media holder assembly 14, which is rotatable with respect to a media autochanger support frame 16 about a media holder rotation axis AA. The media holder assembly 14 includes first and second media engaging members 162, 164 (FIG. 4). The monitor assembly includes first indicia 350, FIGS. 6 and 18, located on the first media engaging member 162, second indica 35 located on the second media engaging member 164 and an indicia sensor 370 mounted on the support frame 16. The monitor assembly may further include a data processor 374 which analyzes the sensor signals to determine the angular orientation of the media holder assembly 14 and to determine whether an adjacent media engaging member 162 or 164 is in a linear registration position.

Having thus described the displacement monitor in general, one specific embodiment of the displacement monitor and an associated media autochanger will now be described in further detail.

Media Autochanger

FIG. 1 illustrates a media autochanger i.e., a media handling and transporting apparatus adapted for handling media units 50, 52 such as optical disks, magnetic disks, data tapes and the like which are typically enclosed within media housings or cartridges. Media autochanger 12 may linearly displace the media units 50, 52 in a lateral direction (XX) a longitudinal direction (YY) and in a vertical direction (ZZ).

The media autochanger 12 may include a plurality of storage bays 60, 62, etc., in which a plurality of media units 50, 52 etc., are stored. The storage bays may be arranged in a plurality of vertical stacks or columns 64, 66 which may also include media drive units 68, 70.

Figure 2:
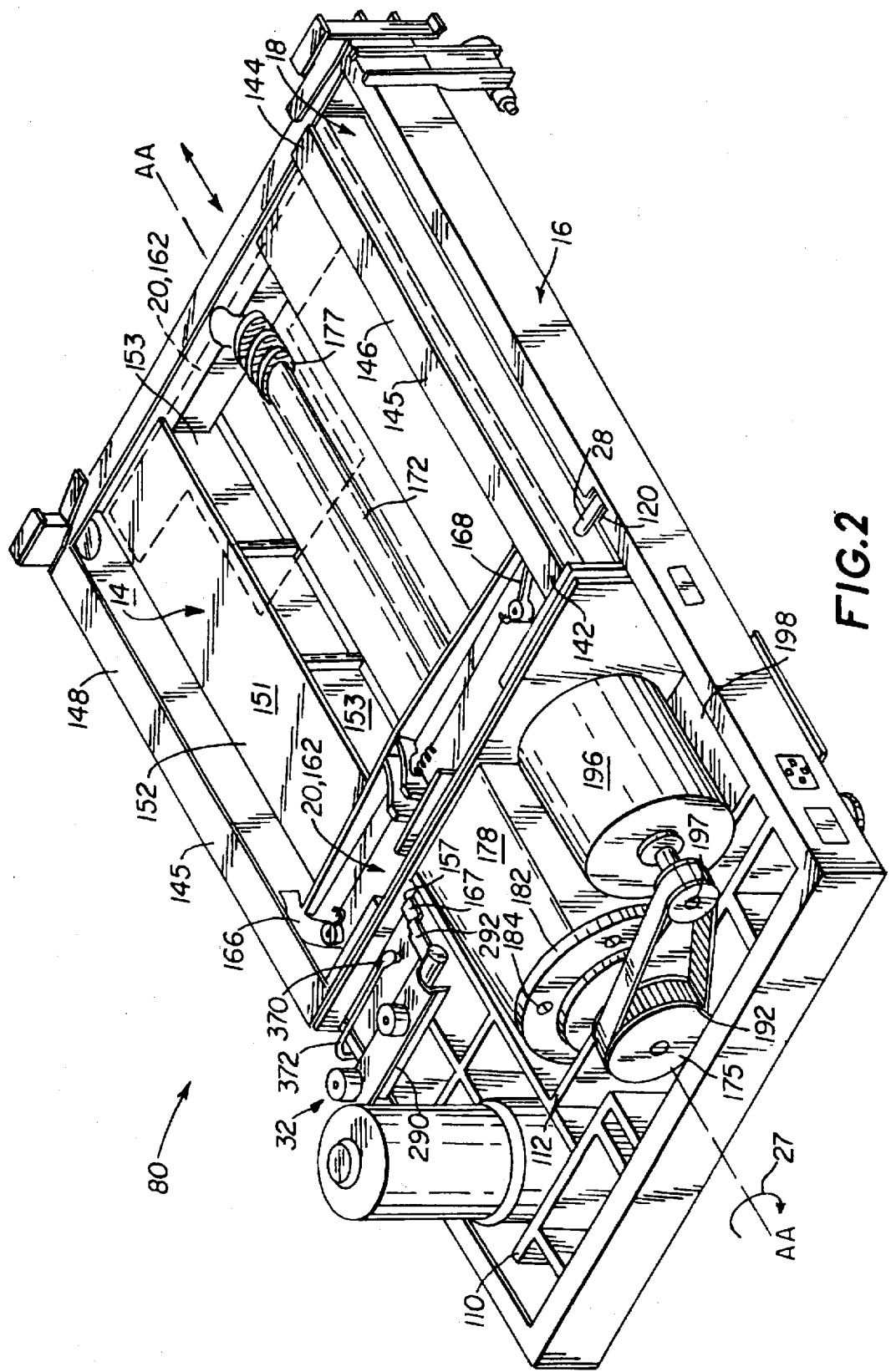
FIG. 2 is a perspective view of a portion of a media autochanger including a media holder assembly and associated support frame, showing the holder assembly in one of its two angular registration positions.
Figure 3:
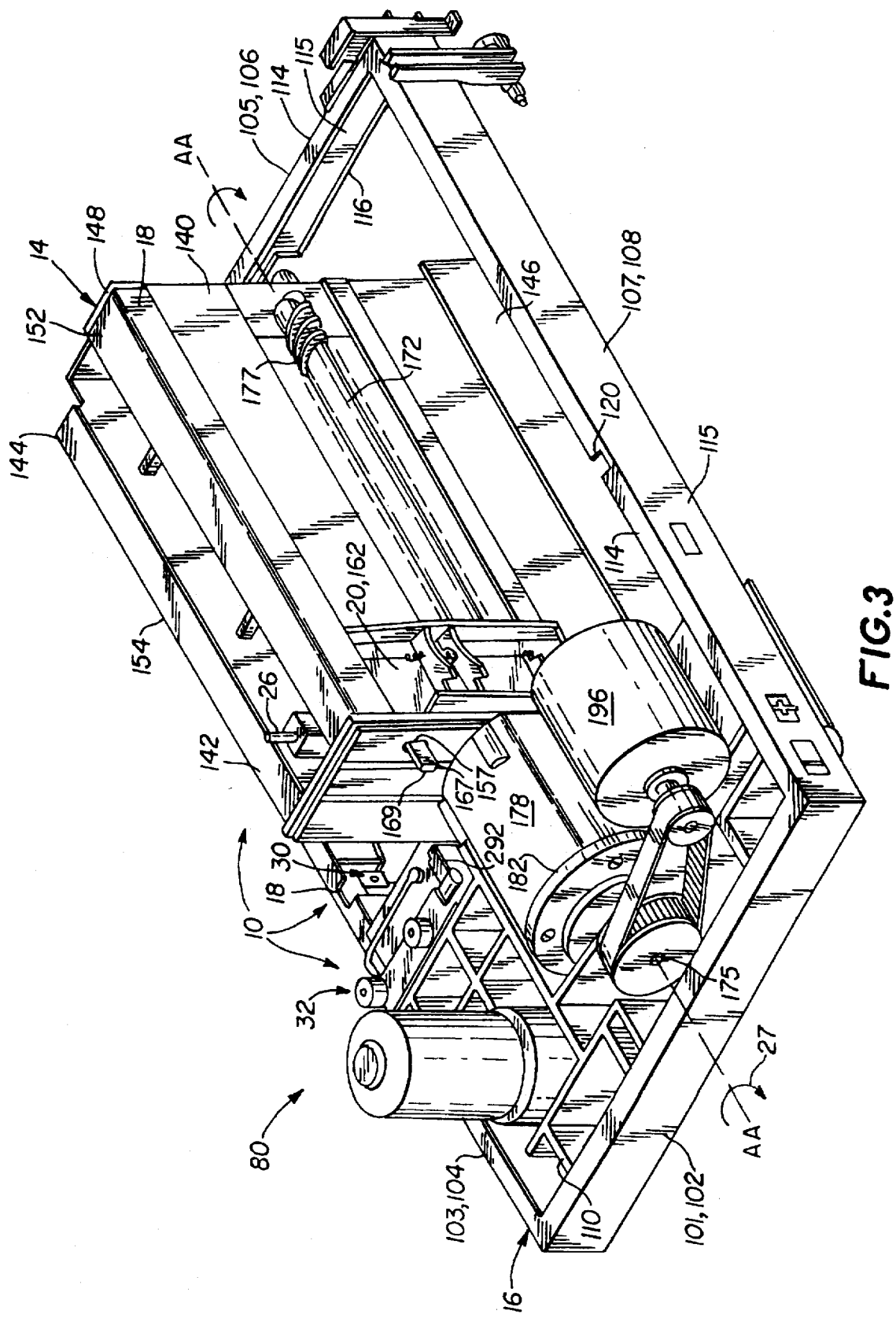
FIG. 3 is a perspective view of the media holder assembly and associated support frame of FIG. 2 showing the media holder in rotational transition between registration positions.

A cartridge transporting assembly of the media autochanger is adapted to engage a cartridge in a storage bay or drive and to displace the cartridge in a longitudinal (XX), lateral (YY) and vertical (ZZ) direction and is also adapted to flip the media unit about a longitudinal axis. The assembly 80 for producing longitudinal displacement and flipping displacement about a longitudinal axis is best shown in FIGS. 1 through 3 and includes media holder assembly 14 and media holder assembly support frame 16. Assembly 80 is supported by a vertical displacement assembly 82 such as that disclosed in the above cited references and particularly U.S. patent application Ser. No. 08/020,160 filed Feb. 18, 1993 for LINEAR DISPLACEMENT AND SUPPORT APPARATUS FOR USE IN A CARTRIDGE HANDLING SYSTEM of Luffel et al. The vertical displacement assembly 82 is in turn supported on a horizontal displacement assembly 84 which may be of a type described in any of the above cited references.

The vertical displacement assembly 82 which supports assembly 80 holds support frame 16 in a fixed angular orientation, i.e., frame 16 is not angularly displaced relative to any of axes XX, YY or ZZ during autochanger operation. Support frame 16 provides an angular frame of reference for rotation of media holder assembly 14.

As best illustrated by FIGS. 2 and 3, the support frame 16 has a generally rectangular shape having a rear end portion 101, a first lateral side portion 103, a front end portion 105 and a second lateral side portion 107 formed by U-shaped channel members 102, 104, 106 and 108, respectively. Support frame 16 also includes web structure 110 supported on interior portions of the U-shaped channel members. The support frame 12 also includes an interior cross member 112 which is mounted on portions of web structure 110 and which rotatably supports a rear end portion of threaded shaft 172 as described in further detail below.

Each U-shaped member has an upper and lower inwardly extending arm portion 114, 116 which is integrally formed with a vertically extending central body portion 115, as best seen on front member 106 in FIG. 3. Cutouts 118, 120 are provided in each of the upper arm portions of lateral members 104 and 108, respectively, and identical cutouts (not shown) are provided in the lower arm portions of lateral members 104 and 108 directly below the upper cutout portions. These cutouts are aligned with and allow passage of studs 26, 28 when media holder assembly 14 rotates about axis AA as described in detail below. Stud latcher 30 is located in channel 104 proximate to the cutout portions 118, etc., therein as is also described below.

As previously mentioned, the assembly 80 for producing longitudinal displacement and flipping displacement of media units 50, 52, etc. includes a media holder assembly 14 which is rotatably mounted within support frame 16. As best illustrated in FIGS. 2, 3 and 4, the media holder assembly 14 may comprise a generally rectangular, box-shaped chassis 18 having a first (rear) longitudinal end portion 142, a second (front) longitudinal end portion 144, a first lateral side portion 146 and a second lateral side portion 148. In one preferred embodiment of the invention the media holder assembly 14 comprises first and second, parallel, spaced-apart, longitudinal extending wall portions 151, 153 which each have edge portions which abuttingly engage first and second end portions 142, 144 and first and second lateral side portions 146, 148 of the chassis 18. Each of the lateral side portions 146, 148 has an upper, inwardly extending flange portion 145 and an identical lower inwardly extending flange portion (not shown).

Each longitudinally extending wall portion 151, 153 and associated portions of the first and second lateral side portions of the chassis form identical first and second chassis sleeve portions 152, 154 which are adapted to receive and support media units e.g., 50, 52 therein.

Figure 5:
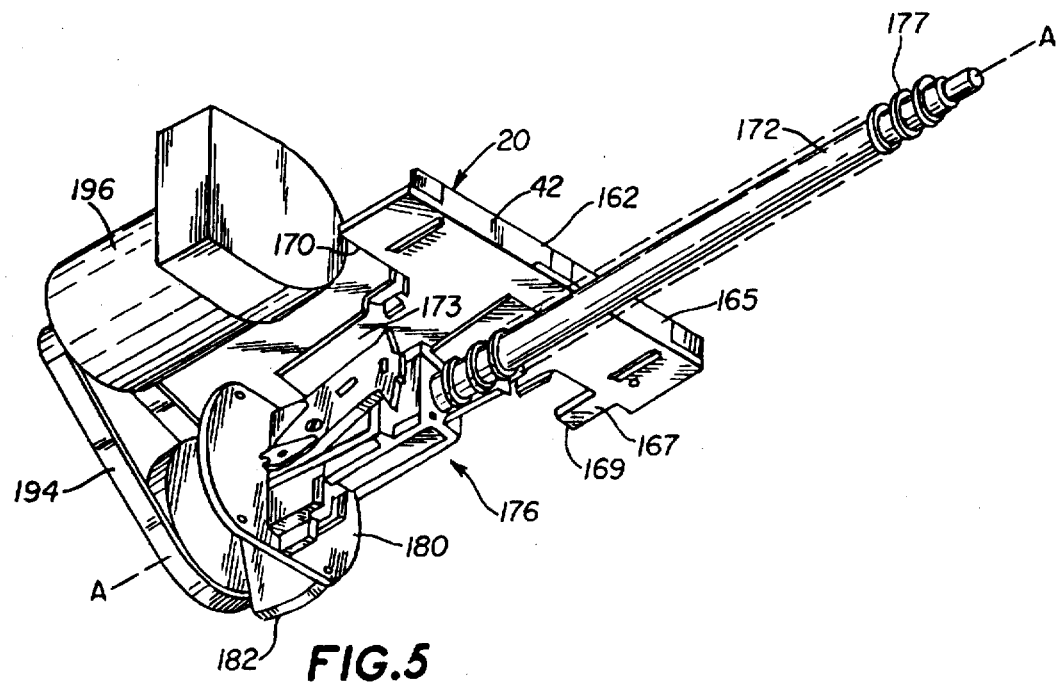
FIG. 5 is a bottom perspective view of a portion of the media holder assembly of FIGS. 1–4 with the media holder chassis and the support frame removed.

The media holder assembly 14 also comprises a media engager 20 positioned within chassis 18. In the preferred embodiment illustrated herein, the media engager 20 comprises a first engager member 162, FIGS. 2, 3, 4 and 5 having a central, longitudinally extending axis (BB) parallel to the media holder flip axis (AA). First engager member 162 is positioned within the chassis first sleeve portion 152. The media engager 20 also comprises a second engager member which is longitudinally displaceable along a central displacement axis (CC) parallel to axes (BB) and (CC). The second media engager member 164, which may be identical to the first engager member 162, is positioned within second chassis sleeve portion 154. As best shown by FIG. 3, each of the engager members comprises a flat front edge 165 which is adapted to abuttingly engage a media unit for the purpose of pushing the media unit out of the sleeve; a rear projection portion 167 which is adapted to pass through an associated opening in the rear portion of the chassis 18 to trip the stud latcher 30 with a flat rear end surface 169 thereof, FIGS. 2, 5 and 6. Each engager member also has a generally flat edge surface 170, FIG. 5, from which the rear projection 167 extends. Each engager member has a rear tail portion 173, FIG. 5, which projects into a transmission housing as described below. Each media engager member also comprises first and second spring-loaded fingers 166, 168 mounted on an outwardly positioned face thereof. The first and second fingers 166, 168 are adapted to engage notches in lateral edge portions of media cartridges 50, 52 allowing the associated engager member to pull the engaged media cartridge from a storage location or drive unit into the associated sleeve portion 152, 154 of the chassis 18.

The media holder assembly has two rotational registration positions with the frame: an "engager member 162 up" position as shown in FIG. 2, and an "engager member 164 up" position rotated 180 degrees from the member 162 "up" position. The member 164 up position is identical in appearance to the member 162 up position shown in FIG. 2 since the media engagers 162 and 164 and the associated sleeve portions 152, 154 are identical and positioned on opposite sides of the media holder assembly.

Each engager member 162, 164 is drivingly engageable with a threaded shaft or lead screw 172 having a longitudinal rotation axis which is coaxial with the flip axis (AA) of the media holder assembly 14.

A first end portion 175 of threaded shaft 172 is rotatably supported, as by a conventional bearing assembly (not shown) mounted in cross frame member 112. The second end 177 of the threaded shaft is supported as through a conventional bearing assembly on the support frame 16 at a mid-portion of front U-shaped channel 106. The lead screw 172 is alternately selectively engageable with either the first engager member 162 or second engager member 164 through operation of a transmission assembly 176 such as that fully described in U.S. patent application Ser. No. 08/020,160 filed Feb. 18, 1993 for LINEAR DISPLACEMENT AND SUPPORT APPARATUS FOR USE IN A CARTRIDGE HANDLING SYSTEM of Luffel et al., incorporated by reference above. The transmission assembly 176 may be provided within a transmission housing 178 which comprises a rear face plate 180.

A brake drum member 182 is fixedly attached to the housing rear face plate 180 as by projecting bolt and nut assemblies 184 or other conventional attachment means.

A gear 192 may be mounted near a terminal end of the first end portion 175 of lead screw 171. Gear 192 is connected through a drive belt 194 to a drive motor 196 having a drive shaft 197 parallel to shaft 172 and which is driveable in a forward and reverse direction. Drive motor 196 is fixedly mounted on the support frame as through a motor bracket 198 fixedly secured to web structure 110 as by bolts or other conventional attachment means. The transmission assembly 176, transmission housing 178 and brake drum 182 are all fixedly attached to the media holder assembly and rotate as a unit when the media holder assembly rotates.

Stud Latcher

Figure 6:
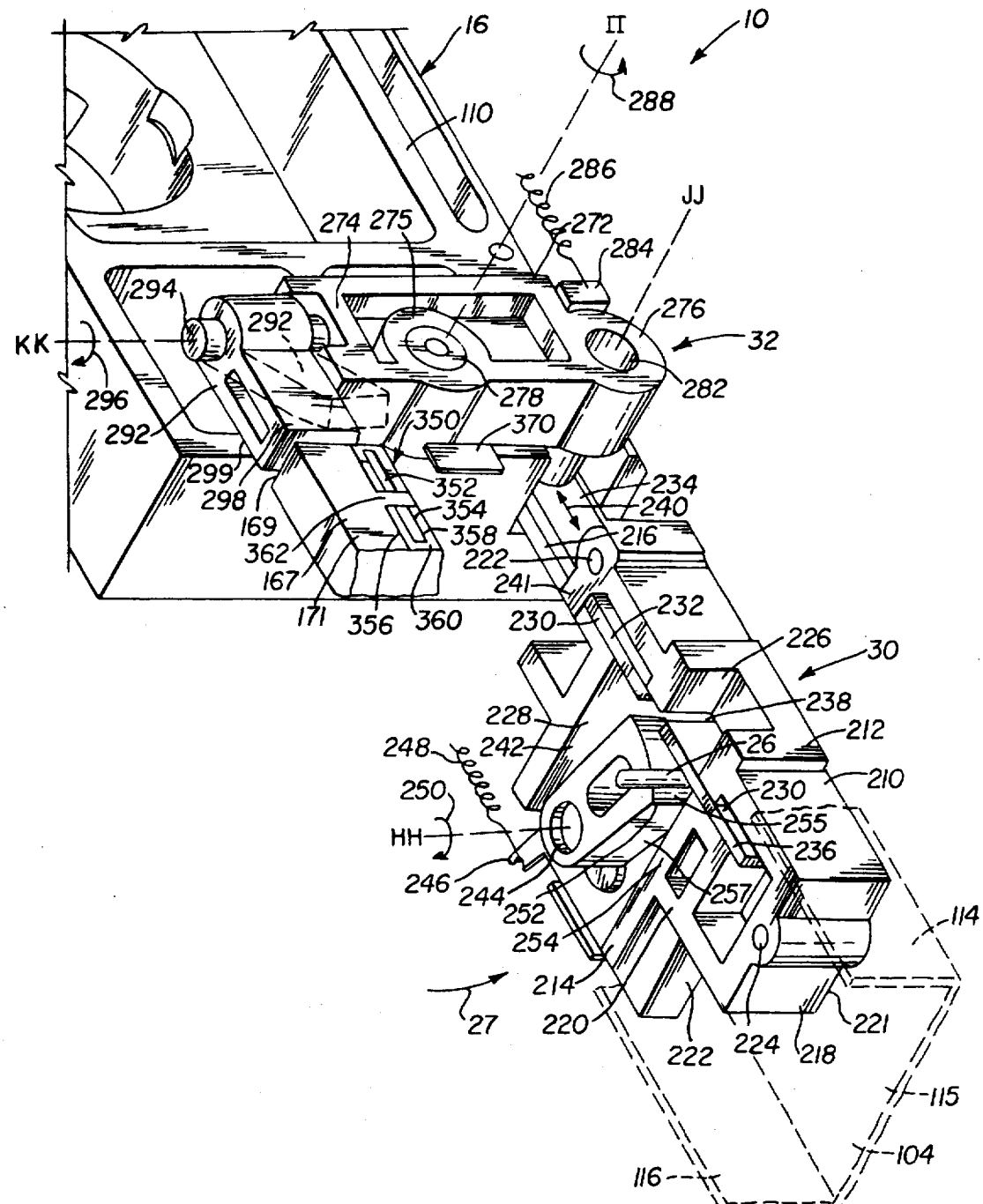
FIG. 6 is a detail perspective view of a latching assembly and tripping assembly associated with the support frame shown in FIGS. 2–4 and showing a laterally extending stud associated with the media holding assembly in latched engagement with the latching assembly.

As best illustrated in FIGS. 3 and 6, stud latcher 30 may comprise an assembly which includes a bracket member 210 which is received inside of U-shaped channel member 104 (shown partially in phantom in FIG. 6) below cutout 118 therein. Bracket member 210 comprises a top portion 212, a bottom portion 214, a rear end portion 216, a front end portion 218, a first lateral side portion 220, and a second lateral side portion 221. The second lateral side portion 221 is positioned in abutting engagement with main body portion 115 of U-shaped channel member 104 and is held in fixed relationship therewith by attachment devices such as, for example, screws (not shown) received through attachment bores 222, 224 in the bracket member and corresponding bores (not shown) in the channel member.

The bracket member 210 has a top opening 226 which is at least as wide as the cutout 118, FIG. 3, in the U-shaped channel and which is positioned in alignment with cutout 118 and the identical cutout in the U-shaped channel positioned directly below cutout 118. The bracket member 210 also comprises a lower opening 228 which communicates directly with the lower channel cutout (not shown) and with cutout 118 through top opening 226. The upper and lower cutouts 118, etc. in the U-shaped channel and the top opening and lower opening 226, 228 in the bracket members are located in the circular rotation path of studs 26, 28 and would allow free movement of the studs through this rotation path except for other components in the stud latcher 30, described below, which selectively interfere with such movement.

A longitudinally extending opening or slot 230 extends from a rear portion to a front portion of the bracket member 210 and accepts a slide plate 232 therewithin. Slide plate 232 comprises a rear end portion 234 and a front end portion 236 and has a central, cutout opening 238 which is selectively movable into and out of alignment with bracket top opening 226. Rear end portion 234 of the slide plate is slidingly, pivotally attached to a pivot member 272 of the stud latch tripper 32 and is forwardly and rearwardly longitudinally displaceable by pivotable movement of the pivot member 272 to cover and uncover top opening 226 to prevent or allow passage of the studs 26, 28 therethrough. The slide plate 232 is restrained by guide portions of the bracket against movement other than longitudinal movement 240. The guide devices may be, for example, an interior, longitudinally extending boss 241 in the slide plate 232, FIG. 7, which is received in a conforming elongate groove (not shown) on an interior surface of bracket member 210 and/or may comprise an exterior guide surface such as bracket portion 241 and wall portion 115 of U-shaped bracket 104 or any other guide means.

As also illustrated by FIG. 6, a pivotal latch member 242 is pivotally attached at a bottom portion 244 thereof to bracket 210 for pivotal movement about lateral axis HH. The pivotal latch member 242 may comprise a bottom portion attachment tab 246 which is connected to a first end of a bias member 248 such as a coil spring which may be attached at the opposite end thereof (not shown) to a fixed portion of support frame 16. The bias member 248 biases the pivot member 242 in pivot direction 250 urging a top forward edge portion 252 of the pivot member into engagement with a forward wall portion of bracket lower opening 228 when no stud is present, FIG. 10, and which urges a top, arcuate surface portion 255 of the pivotal latch member against the bottom of a stud to lock it into non-movable abutting relationship with slide plate 232 when a stud is in the registration position illustrated in FIGS. 2, 6 and 7. The pivotal latch member 242 is thus constructed and arranged to operate as a one-way gate such that a stud 26 or 28, while moving in its rotation path, will initially, FIG. 12, contact lower surface 255 and cause the pivotal latch member to pivot in the direction opposite its biased direction 250 until the stud passes the top forward edge 252 thereof, after which member 248 will pivot in the biased direction 250 until the stud is locked immobily into position between the upper surface 255 of the pivotal latch member 242 and the lower surface of the slide plate 232.

Stud Latcher Tripper

Figure 8:
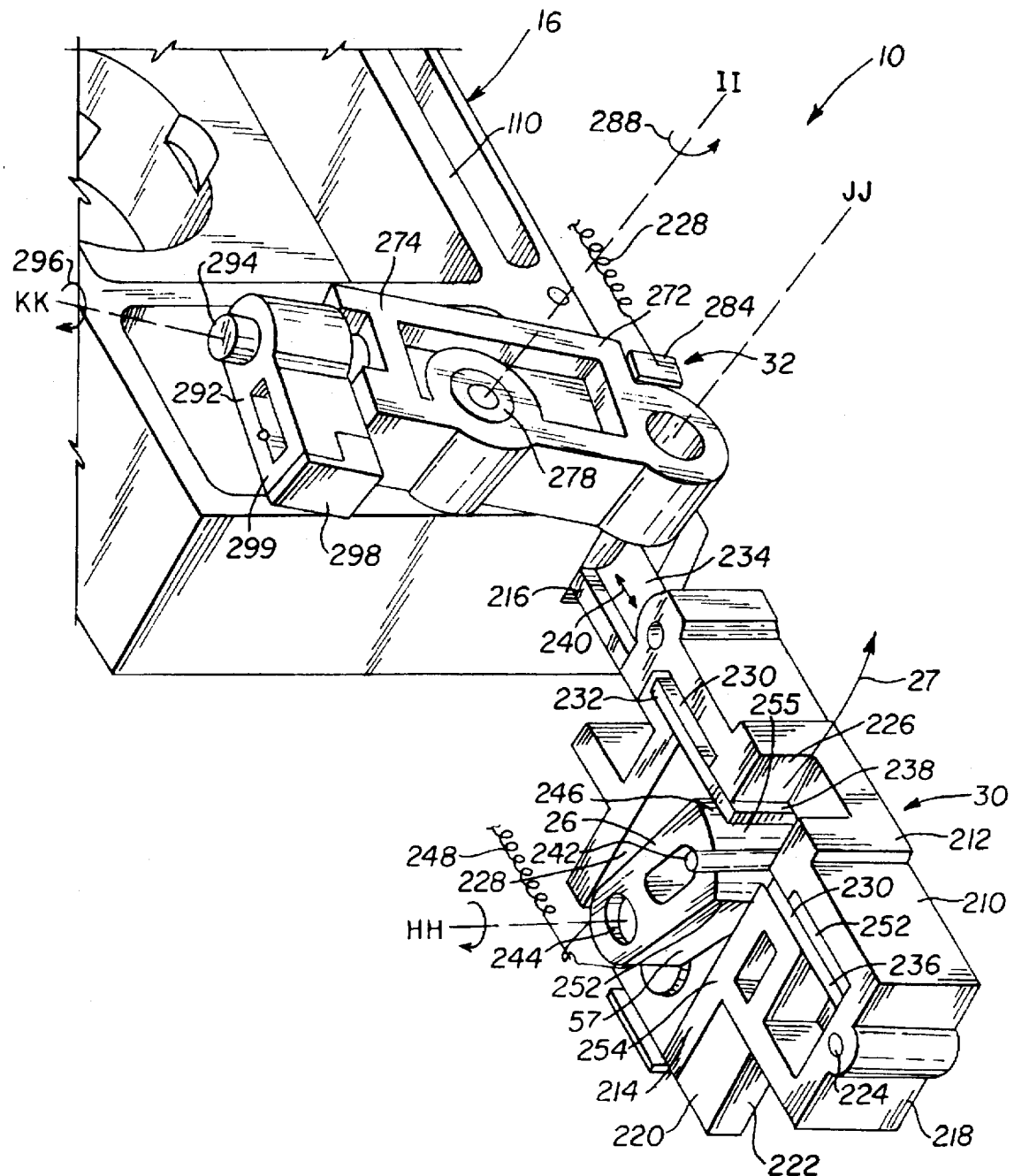
FIG. 8 is a detail view similar to FIG. 6 except showing the latching assembly tripped to release the stud.

As best illustrated in FIG. 6, stud latcher tripper 32 comprises a first pivot member 272 having a first end 274, a second end 276 and an intermediate portion 275 having a shaft receiving bore 278 therein. A pin received through the shaft receiving bore pivotally attaches the pivot member 272 to the frame web 110 and allows pivotal displacement of the first pivot member about pivot axis II. A shaft receiving bore 282 in the second end 276 of the first pivot member is adapted to receive a pin which attaches the first pivot member to an arcuate slot (not shown) in slide plate 232 to define a shifting pivot axis JJ. The second end 276 also comprises a connector tab portion 284 attached to a bias member such as a coil spring 286, which is attached at an opposite end to the frame web 110 and which biases the first pivot member in bias direction 288. A stop on the frame web 110, which may be an internal stop member, (not shown), limits the pivotal movement of the first pivot member in the direction opposite to direction 288 to the position illustrated in FIG. 6. Another stop member (not shown) may limit the rotation in the direction opposite to 288 to the position illustrated in FIG. 8.

A tripper second pivot member 292 is mounted as by a pivot shaft 294 on the first end 274 of the first pivot member, enabling pivotal movement of member 292 about pivot axis KK. A bias member such as an internal spring (not shown) biases the tripper second pivot member 292 in biased direction 296. Rotation in direction 296 is limited to the position illustrated in FIG. 6 by the upper surface of web 110 or other stop means. Second pivot member 292 comprises a front end face 298 which is engageable with a rear end face 169 of engager rear projection portion 167. The second pivot member 292 also comprises a flat bottom end face 299 which is engageable with an upper surface 171 of cartridge engager rear projection portion 167 during some operating conditions as described in further detail below, e.g., FIG. 13.

Operation of the Flip-Latch Assembly

Figure 13:
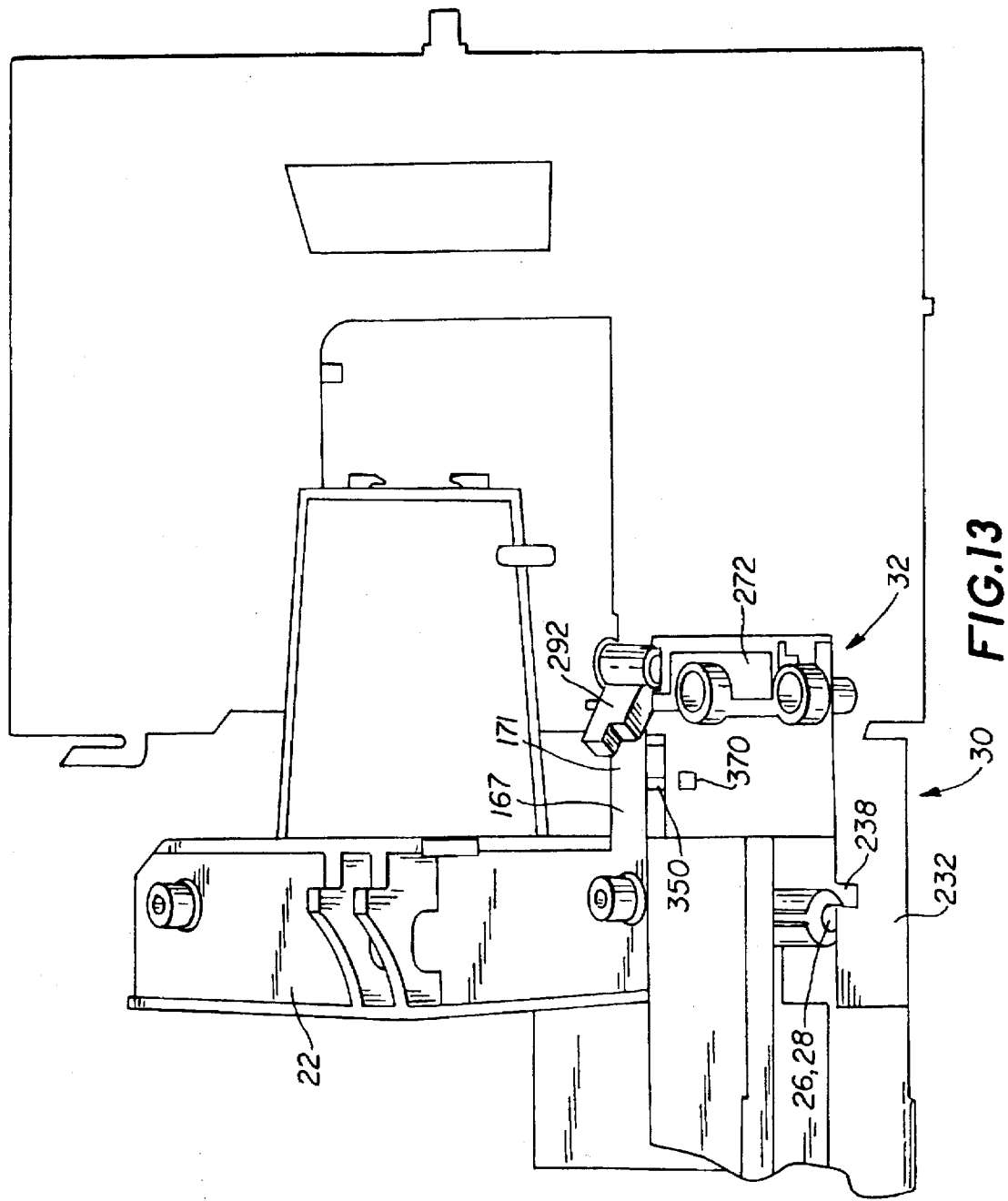
FIG. 13 is a view similar to FIGS. 7, 9 and 11 but showing the various components in the operating state associated with FIGS. 2 and 6.

FIGS. 2, 4 and 13 show the position of the flip-latch assembly 10 immediately after the autochanger media holder assembly 14 has completed a flip and is positioned in a first registration position in which media engager 162 is up and engager member 164 is down. FIG. 6 shows in phantom the position which the tripper second pivot member 292 occupies at this time. The tripper first pivot member 272 is in its normal bias position and the second tripper pivot member 292 is pivoted up and away from its normal biased position at an angle of about 45 degrees. The second tripper pivot member has been urged away from its normal bias position by the rear projection portion 167 of media engager 162 which has rotated up from a position directly below the second tripper pivot member 292 to the position which the second tripper member itself occupies in its normal biased position. The second tripper pivot member 292 thus is supported in its flipped-up position by top surface 171 of engager rear projection portion 167 as best shown in FIG. 13.

In this initial operating state, each of the media engager members 162, 164 are in a fully retracted position, i.e., are at the rearmost position of each of these members. The immediately preceding rotation of media holder assembly 14 in the flip direction 27 was terminated by contact of media holder laterally extending stud 26 with the slide plate 232 of the stud latcher assembly 30. The transmission assembly which transmits driving force from the motor to the lead screw 172 is constructed and arranged (as explained in detail in U.S. patent application Ser. No. 08/135,067 of Rugg, et al.) such that no further rotation of the motor in the direction associated with the flipping movement 27 of the media holder assembly 14 is possible until after motor reversal.

Figure 14:
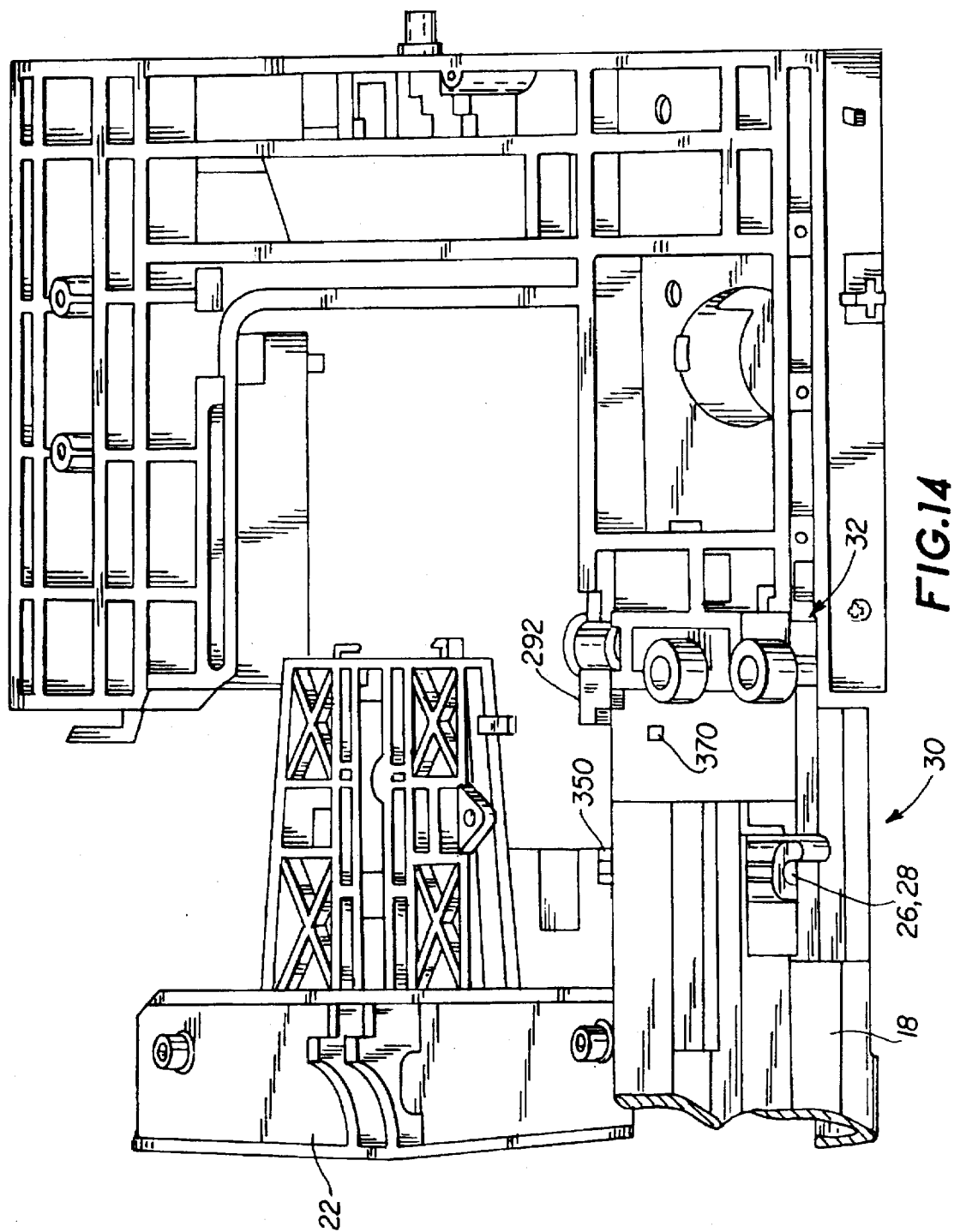
FIG. 14 is a view similar to FIG. 13 except showing a top media engager moved forward from the position of FIG. 13.

The direction of rotation of the motor is reversed to perform the next autochanger operation. When the motor is operated in reverse, the transmission assembly (as explained in detail in the Rugg et al. patent application referenced above) operates to engage the currently upwardly positioned engager member, eg., first engager member 162, causing it to be longitudinally forwardly displaced. In a typical apparatus in which the length of the second pivot member of the tripper assembly 292 has a length of about 15 millimeters, such forward displacement of the first engager member 162 by about 8 millimeters allows the second pivot member 292 of the tripper assembly to pivot downwardly into its normal biased position which is best illustrated in FIG. 6 (in solid lines) and in FIG. 7. In this position, in which the second tripper pivot member 292 is in a generally horizontal orientation, the end face 298 of the pivot member 292 is positioned directly opposite the end face 169 of the rear projection 167 of first engager member 162. From this position, further rotation of the drive motor in the same direction causes further advance of the first engager member 162 in a forward longitudinal direction. FIG. 14 shows the position of the media engager after it has moved about thirty millimeters forward from the position shown in FIG. 6. Forward movement of engager member 162 may be continued until the engager member 162 reaches a position near the end of chassis 18 as shown in phantom lines in FIG. 2. This is a movement employed by the autochanger either to move the engager member 162 into position to engage a cartridge 50 positioned in a storage slot 60 or media drive 68, or to move an engaged cartridge from a retracted position within the chassis 18 into an aligned storage bay or drive unit as explained in detail in the Rugg et al. patent application.

In order to disengage the upper engager member 162 and engage the second engager member 164 with the transmission 176, the first engager member must be moved a few millimeters, e.g. 10 millimeters, forward from the position of FIG. 6 and then returned to that position by reversing the motor drive direction. The second engager 164 may now be driven forward by again reversing the motor drive direction. The second engager member 164 may be disengaged and the first engager member 162 re-engaged with the transmission in this same manner as explained in detail in Rugg et al. referenced above.

Figure 7:
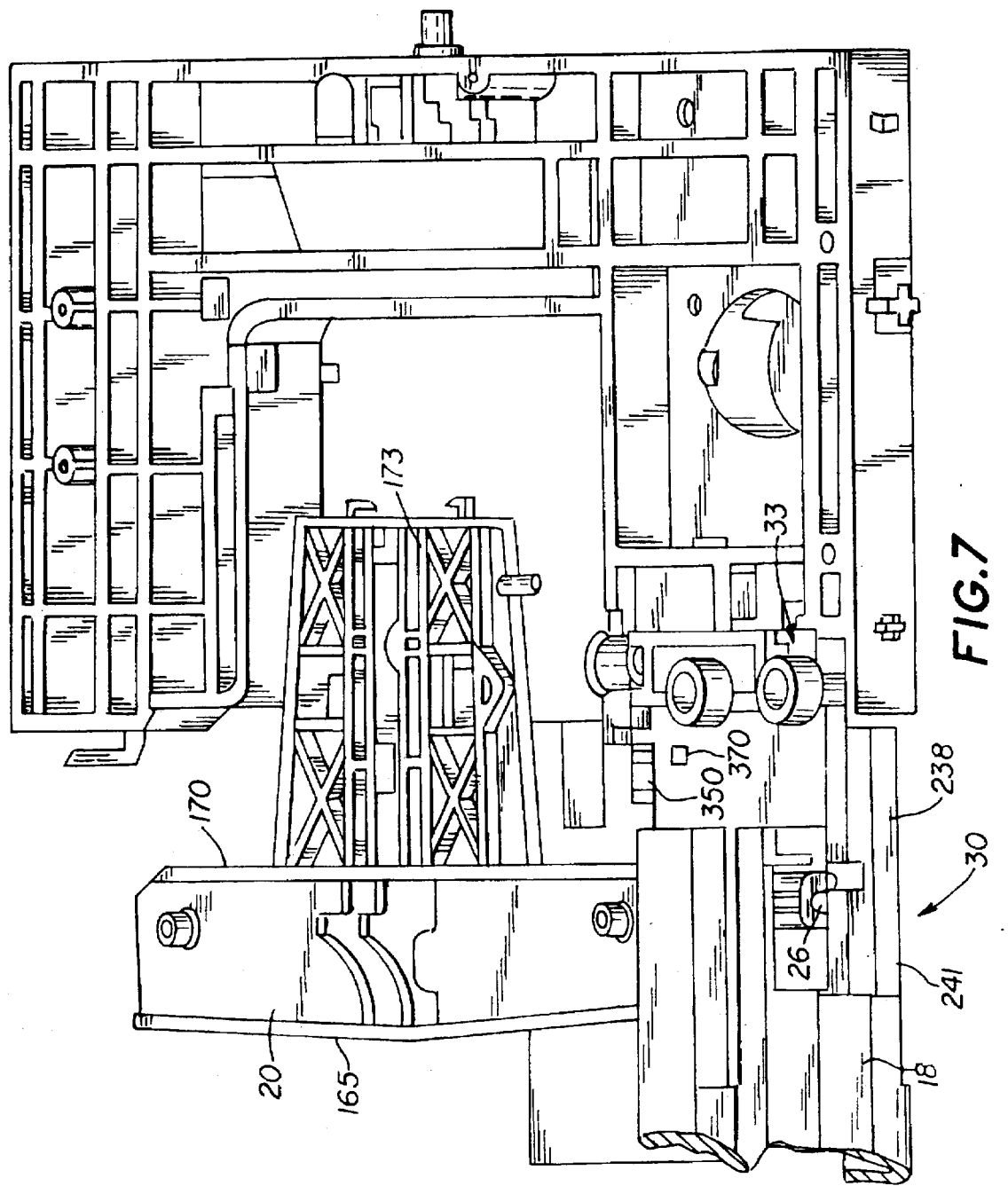
FIG. 7 is a top perspective view of certain components of the media holding assembly, support frame, latching assembly and tripping assembly with certain other components removed for clarity and showing the holding assembly in the registration position shown in FIG. 2 with the latching assembly in the latched state shown in FIG. 6.
Figure 9:
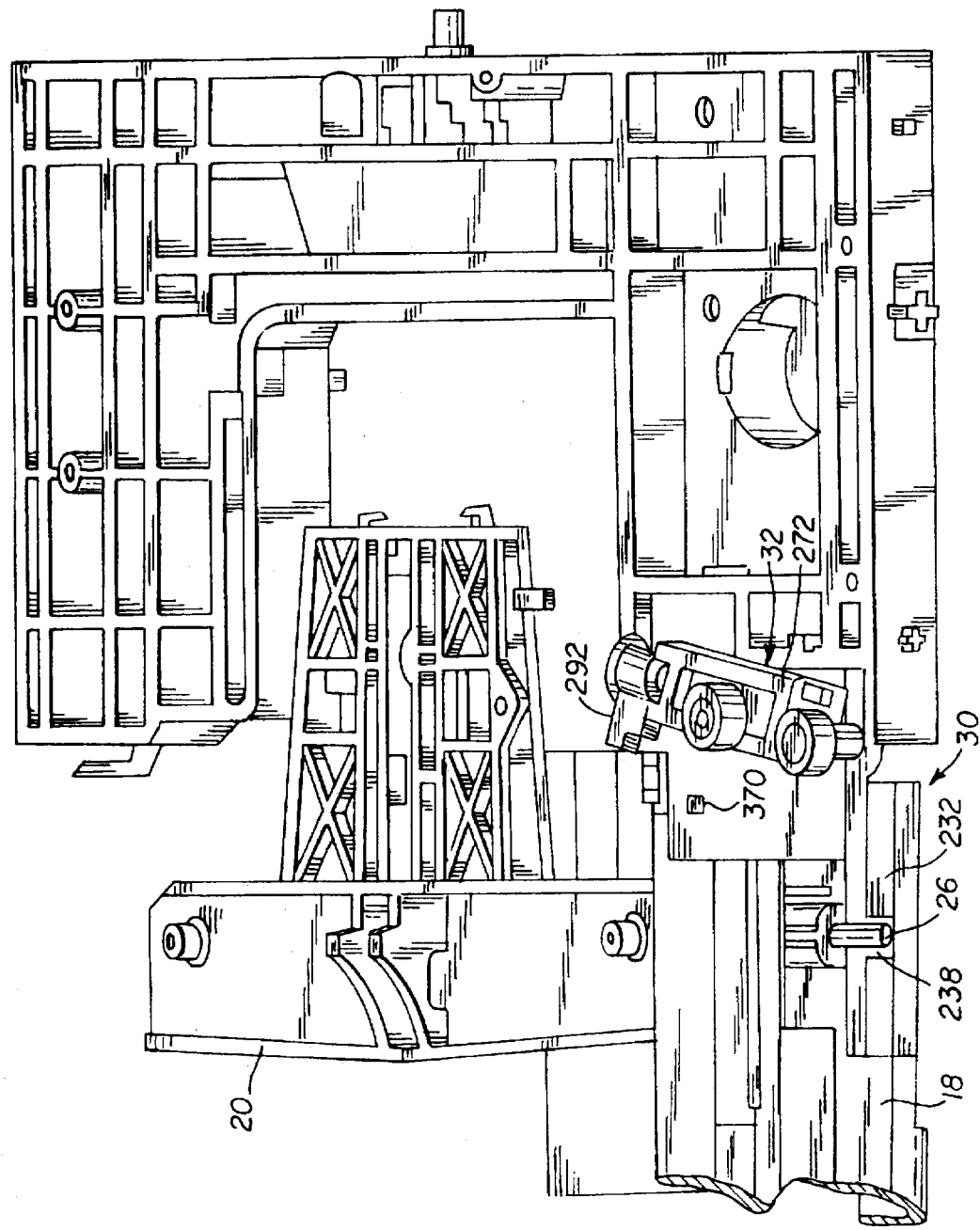
FIG. 9 is a view identical to FIG. 7 except showing the position of various components when the latching assembly and tripping assembly are in an operating state depicted in FIG. 8.
Figure 10:
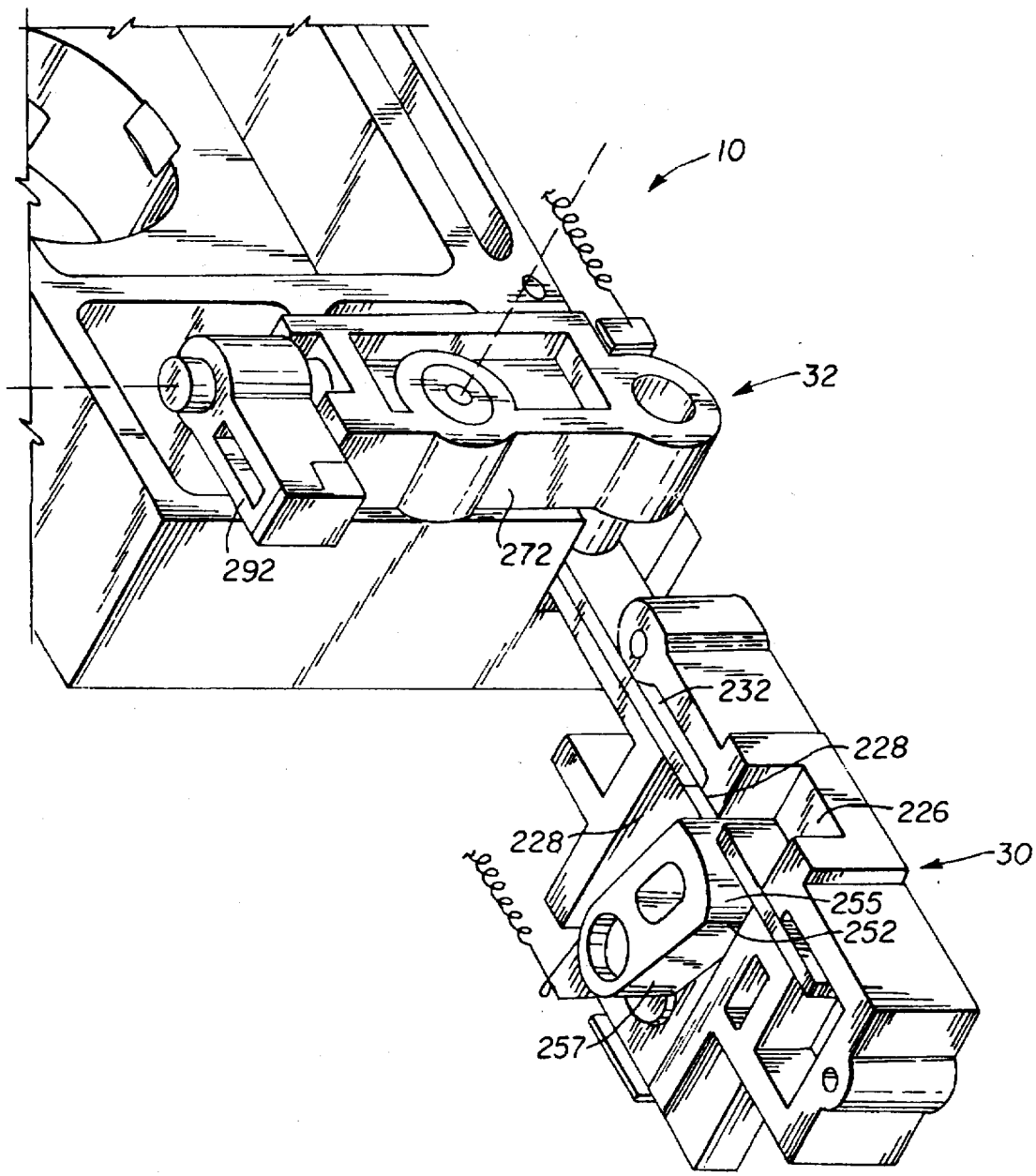
FIG. 10 is a view similar to FIGS. 6 and 8 except showing the latching assembly in a closed state prior to being engaged by a holding assembly stud.
Figure 11:
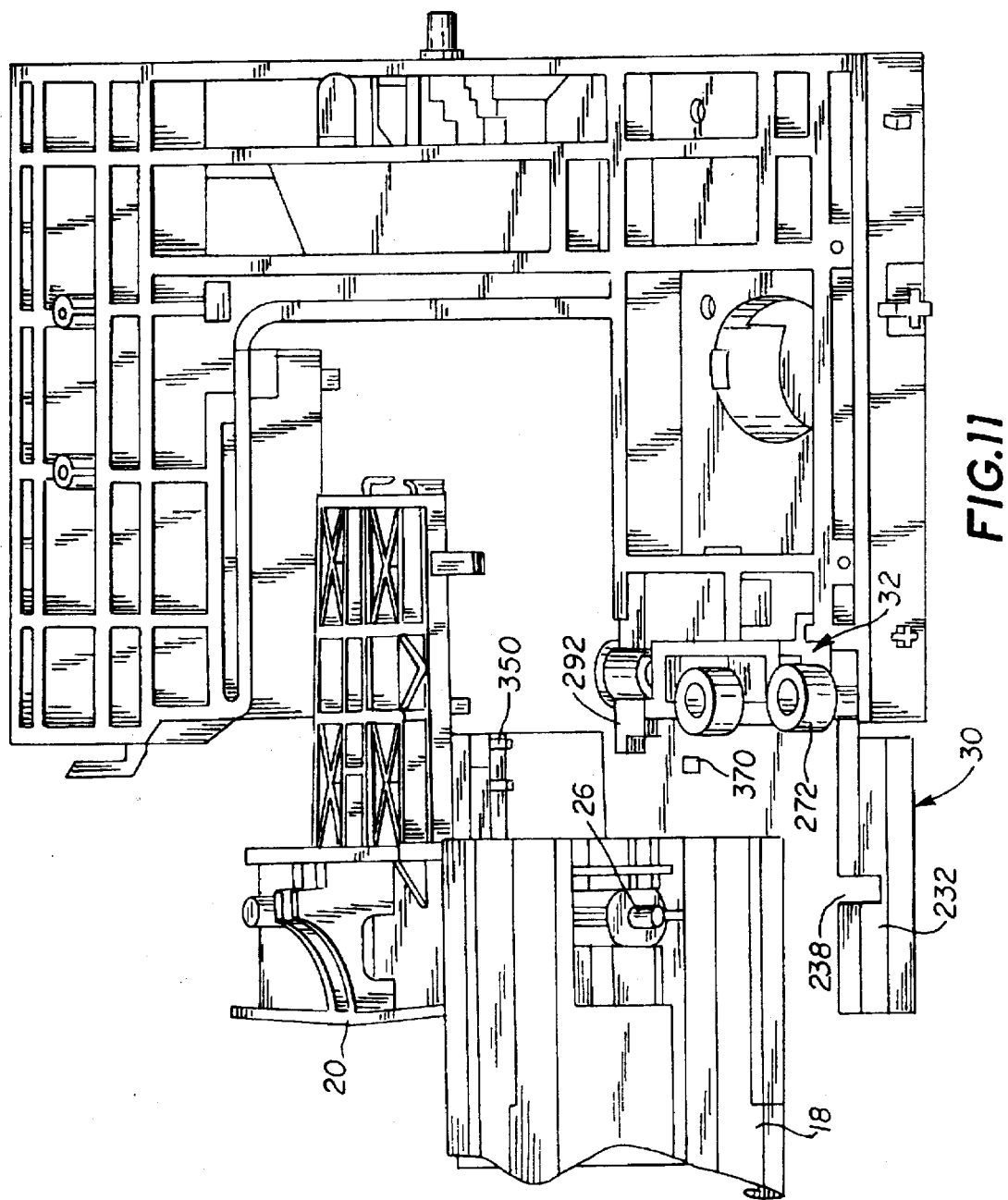
FIG. 11 is a view similar to FIGS. 7 and 9 except showing the various components in an operating state depicted in FIGS. 3 and 10.

In the alternative, once the first engager 162 has been moved forwardly to the position shown in FIGS. 6 and 7, the direction of the drive motor may again be reversed causing the first engager member 162 to be moved rearwardly into abutting engagement with the second pivot member 162 of the stud latcher tripper assembly 32. After initial engagement with the tripper second pivot member 292, further displacement of the first engagement member 162 in the rearward direction causes the tripper first pivot member 272 to rotate from its normal biased position shown in FIGS. 6 and 7 to the angularly displaced position illustrated in FIGS. 8 and 9. As previously described, the pivotal displacement of member 272 about axis II in a direction opposite 288 produces sliding displacement of slide plate 230 in a forward direction causing the central opening 238 thereof to be positioned in registration with the top opening 226 in bracket member 210. This registration between the slide plate opening and the bracket opening 226 releases the stud 26 which was previously captured between the pivotal latch member 242 and the slide plate 232 thus freeing the media holder assembly 14 to again rotate in flip direction 27, i.e., rotation about longitudinal flip axis AA. The media holder 14 thus rotates as illustrated in FIGS. 3 and 11 in rotation direction 27 until completing a 180 degree flip. At the beginning of this 180 degree flip, the rear projection portion 167 of first engager member 162 pivots up and out of engagement with the latch tripper assembly allowing pivot member 278 to return to its normal biased position out of registration with bracket opening 226 as illustrated in FIGS. 10 and 11. In this operating state, the slide plate has closed opening 226 and is positioned to stop the next stud 28 which enters the stud latcher assembly 30.

Figure 12:
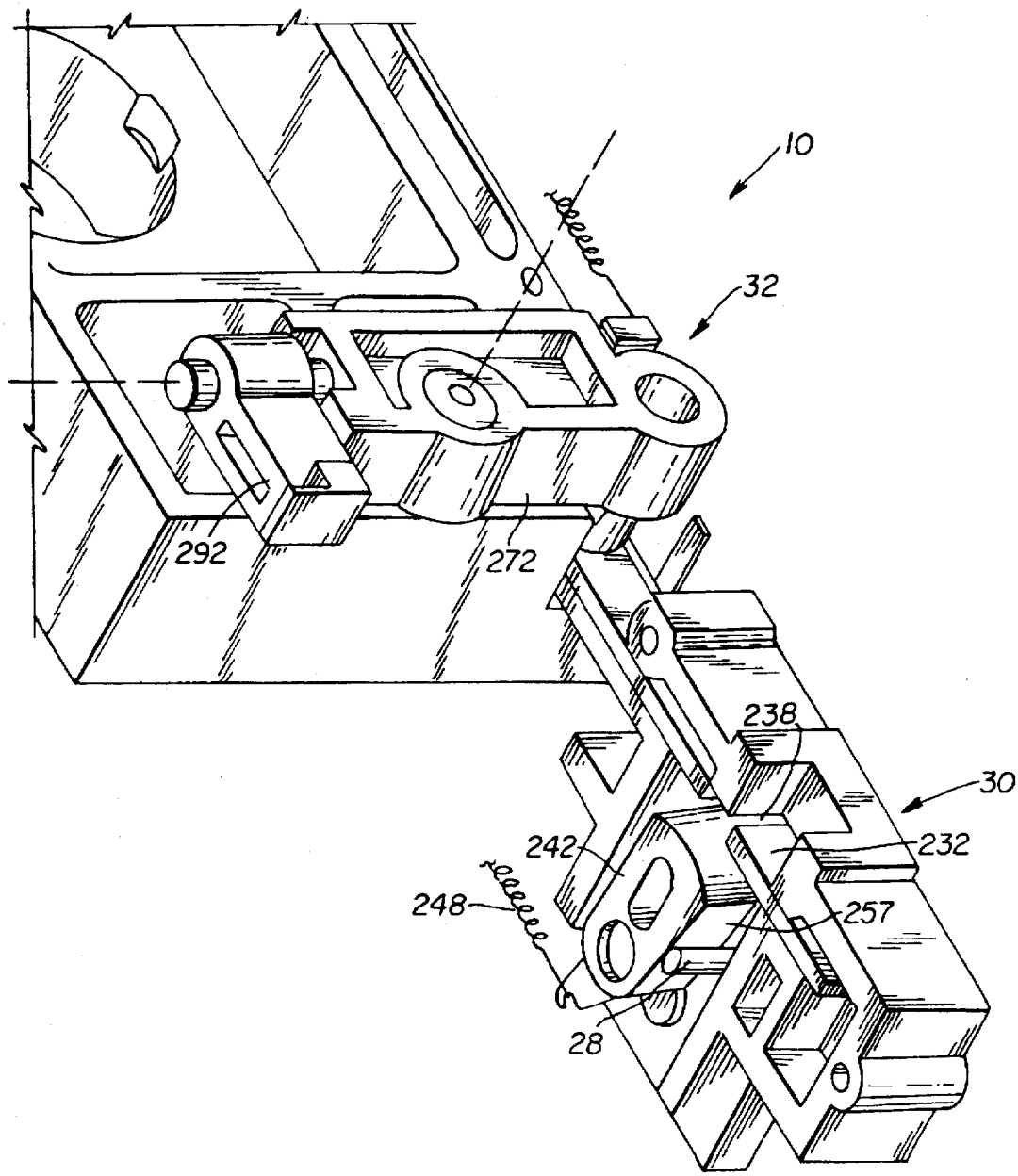
FIG. 12 is a view similar to FIGS. 6, 8 and 10, except showing the initial engagement of a one-way gate portion of the latching assembly by a holding assembly stud.

As shown in FIG. 12, as the flip approaches 180 degrees, the stud 28 opposite the stud 26 originally engaged by the stud latcher 30 comes around and engages a lower surface 257 of the pivotal latch member 242 causing the pivotal latch member to pivot in a direction opposite to the direction in which it is normally biased. The stud 28 proceeds to the stop position shown in FIGS. 13 and 2, except that now the second side of the media holder assembly 14, i.e., the side containing the second engager member 164 is positioned uppermost. As previously described, after passing the upper forward edge surface 252 of the pivotal latch member 242, the pivotal latch member pivots forwardly due to the bias force applied by attached spring 248. The pivotal latch member 242 is constructed and arranged such that the top surface 246 thereof wedges the engaged stud 28 into immobile relationship between the pivotal latch member and the lower surface of slide member 232.

Brake Drum Assembly

Figure 15:
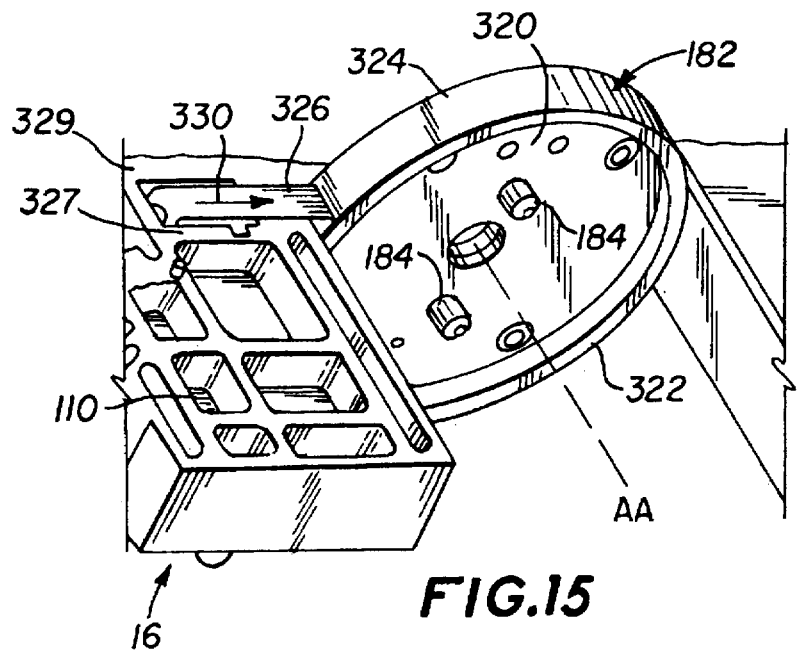
FIG. 15 is a detail top, front perspective view of a brake drum assembly shown in FIGS. 2 and 3 with the attached media holding assembly removed.

As previously mentioned, a brake drum member 182 is fixedly attached as by bolt and nut assemblies 184 to media holder chassis 18, FIG. 2. FIG. 15 shows brake drum member 182 from a perspective reversed from that shown in FIGS. 2 and 3 and with the transmission housing 178 on which the brake drum is mounted removed for clarity. The brake drum member 182 may include a disc-shaped central body 320 and an integrally-formed, cylindrical ring 322 provided at the outer periphery of the central body. The cylindrical ring 322 comprises an outer surface 324 which may be frictionally engaged by a stationary ring engaging member 326 having an arcuate engagement surface 328. The ring engaging member 326 is laterally displaceably mounted on the web structure 110 of support frame 16 as by laterally extending portions 327, 329, etc. of web 110 which support and guide the ring engaging member 326. The ring engaging member 326 is radially, inwardly biased against the outer surface 324 of cylindrical ring 322, i.e. in bias direction 330, by a bias device such as coil spring 332 which engages an interior portion of the engaging member 326 and an opposite abutment surface 333, FIG. 16, of the support frame web 110. The frictional engagement between the ring engaging member 326 and cylindrical ring 322 exerts a torque on brake drum member 182 which resists flipping rotation of media holder assembly 14. This resisting torque slows the rotation of media holder 14 sufficiently to prevent it from overrunning the drive motor 196, i.e., the torque is sufficient to prevent the media holder assembly 14 from rotating faster than the transmission gear with which it is engaged. The driving assembly for the media holder assembly may be constructed as described in U.S. patent application, Ser. No. 08/135,067, of Rugg et al., incorporated by reference above. The amount of torque which is to be applied by the frictional engagement of engaging member 326 with ring 322 will, of course, depend upon the speed and torque characteristics of motor 196 and the friction in the specific drive assembly with which the brake drum assembly is used.

Figure 16:
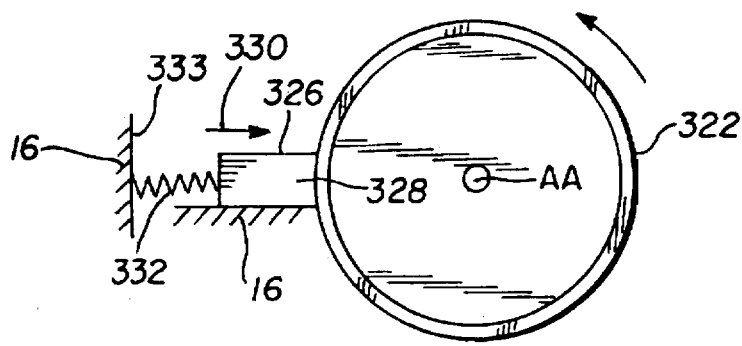
FIG. 16 is a schematic front elevation view of the brake drum assembly of FIG. 15.

In one preferred embodiment, as illustrated by FIG. 16, the cylindrical ring 322 has a perfect cylindrical shape with a constant radius of about 32 millimeters and thus, the frictional force applied on the cylindrical ring 322 by the ring engaging member 326 is approximately constant during the entire flipping cycle.

Figure 17:
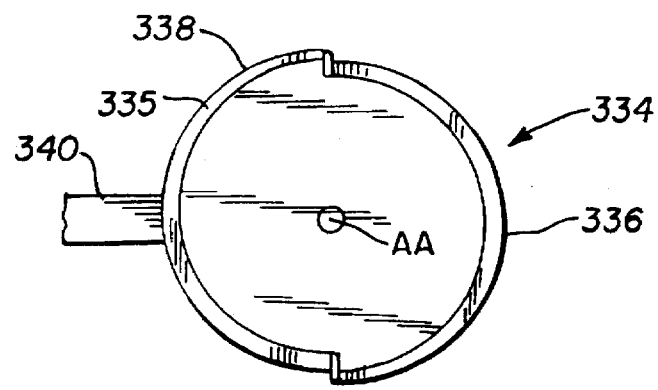
FIG. 17 is a schematic, front elevation view of an alternative embodiment of a brake drum assembly.

In another embodiment, as illustrated in FIG. 17, alternative brake drum member 334 has a peripheral ring 335 provided by a first progressively increasing radius portion 336 and a second progressively increasing radius portion 338 which are provided in diametrically opposed relationship. In this embodiment, each of the progressively increasing radius portions 336, 338 are identical in shape and have a radius varying from about 30 millimeters to about 33 millimeters. The brake drum member 334 is oriented relative to the media holder assembly 14 to which it is attached, such that an associated spring-biased, ring-engaging member 340 is positioned at the smallest radius portion of ring portion 336 at the registration position at the beginning of a first flip cycle in which media engager member 162 is positioned upwardly and stud 26 is latched in the stud latcher, FIG. 2, and such that the minimum radius portion of the other progressive radius portion 338 is positioned in engagement with ring engaging member 340 when the second media engager member 164 is positioned upwardly and the media holder stud 28 is locked in the stud latcher 30. It will thus be seen with the configuration of FIG. 17 that the force resisting rotation which is exerted by the frictional engagement between ring engaging member 340 and the peripheral ring 335 will increase progressively from the beginning of a flip cycle to the end of a flip cycle. Other surface configurations are, of course, possible and may be selected depending upon the characteristics of the media holder 14 and any associated motor 196.

Although engagement between an outer surface portion of a brake drum ring is described specifically herein, it will be appreciated by those having skill in the art that frictional engagement at an interior cylindrical surface of a brake drum member could be used also to produce a force-resisting rotation. Similarly, axial engagement of a surface of disc-shaped central body 320 could also be provided to create a torque resisting rotation.

Magnet and Sensor Assembly

As best illustrated in FIG. 6, a permanent bar magnet 350 having a rear end 352, a front end 354, a first lateral side 356 which is a south pole of the magnet and a second lateral side 358 which is a north pole of the magnet are mounted in a recess 360 of rear projection 167 of first media engager member 162. The magnet 350 may be held in position within recess 360 as by a magnet holding clamp 362 which is integrally formed with rear projection portion 167. A Hall-effect sensor 370 is mounted on support frame 16 laterally adjacent to and immediately forward of the tripper second pivot member 292. The rear projection portion of the second media engager may be identical to portion 167 shown in FIG. 6, except that it has a second magnet 351, FIG. 18, mounted thereon identical to the mounting of magnet 350, except that the poles of magnet 351 are reversed from those of magnet 350. Thus, when the second media engager member 164 is situated with its rear projection portion 167 positioned as in FIG. 6, the side 359 nearer sensor 370 would be the south pole of the magnet and the other side 357 would be the north pole. A second Hall-effect sensor 380 may be mounted on support frame 15 diametrically opposite to the first Hall-effect sensor 370 (with flip axis AA located at the center of an imaginary circle perpendicular to axis AA. Thus, when both media engager members 162, 164 are positioned in their rearmost positions and the media holder is in one of its two rotational registration positions, one sensor, e.g. 370, will sense the proximity of the first magnet 350 and the other sensor 380 will sense the proximity of the other magnet 351 as illustrated schematically in FIG. 18. Hall-effect sensor 370 is connected by leads 372 and Hall-effect sensor 380 is connected by leads 382 to a data processor 374. The data processor 374 may be a conventional microprocessor such as a Intel 486 or Intel Pentium-based microprocessor provided with conventional Hall-effect sensor interface circuitry which enables the signal produced by the Hall-effect sensor to be monitored by appropriate monitoring software such that the magnitude and polarity of the sensor signal may be determined at any selected time.

Figure 19:
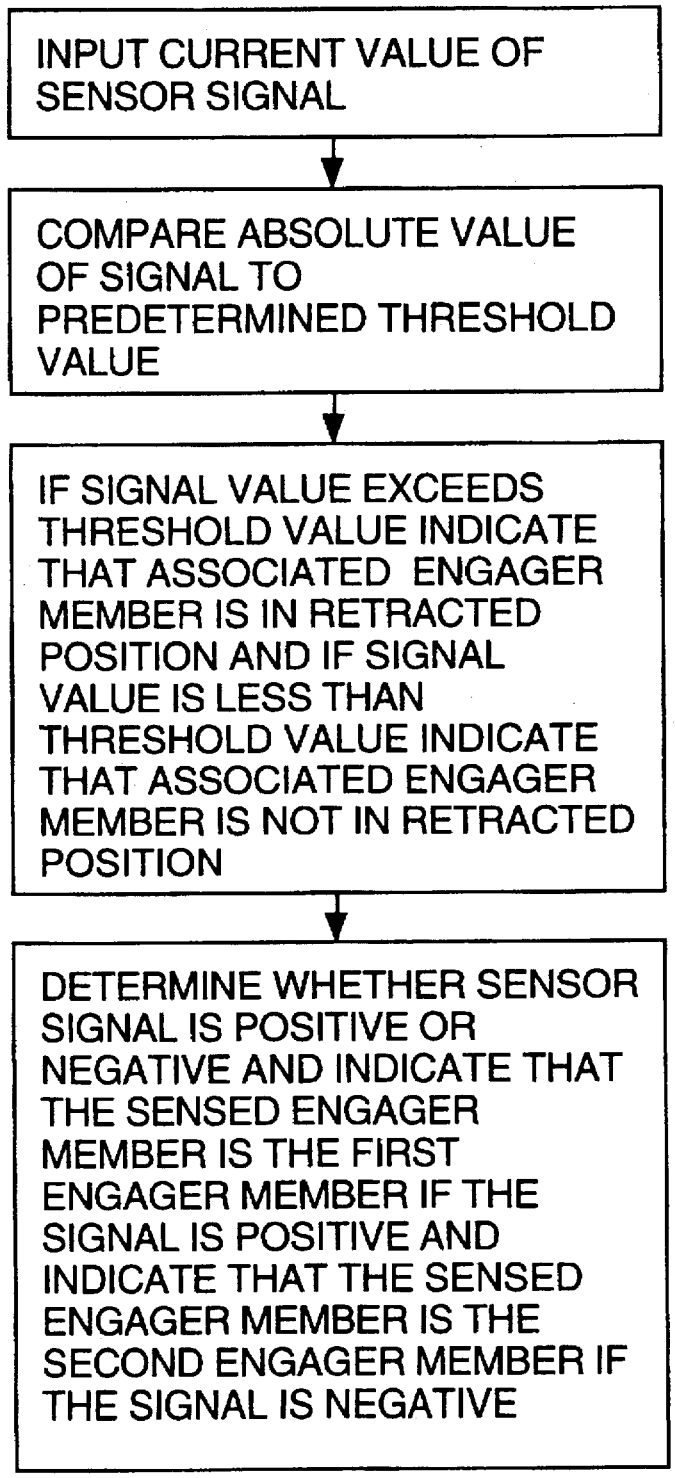
FIG. 19 is a block diagram illustrating basic signal processing operations performed by the data processor of FIG. 18.

FIG. 19 illustrates basic operations performed by the data processor on the input signal from the Hall-effect sensor. A first operation is to determine whether the magnitude of the sensor signal exceeds a predetermined threshold value. If the sensor signal does exceed the predetermined threshold value, then the data processor produces a signal to appropriate control software indicating that a magnet 350 or 351 is in the immediate proximity of the Hall-effect sensor 370. The second operation performed by the data processor is to determine the magnetic polarity of the Hall-effect sensor signal. The signal produced by the Hall-effect sensor may be calibrated such that a positive signal is produced when the sensor is in the proximity of a North pole and a negative signal is produced when the sensor is in the proximity of a south pole. Thus, the determination of magnetic polarity may be made based upon whether the signal is a positive signal or a negative signal. Since the polarity associated with sensing of the permanent bar magnet 350 mounted on the first engager 162 is opposite to the polarity of the permanent bar magnet 351 mounted on the second engager 164, the sign of the signal may be used by the data processor to determine which of the media engager members 162 or 164 is positioned next to the associated Hall-effect sensor 370 or 380.

Figure 20:
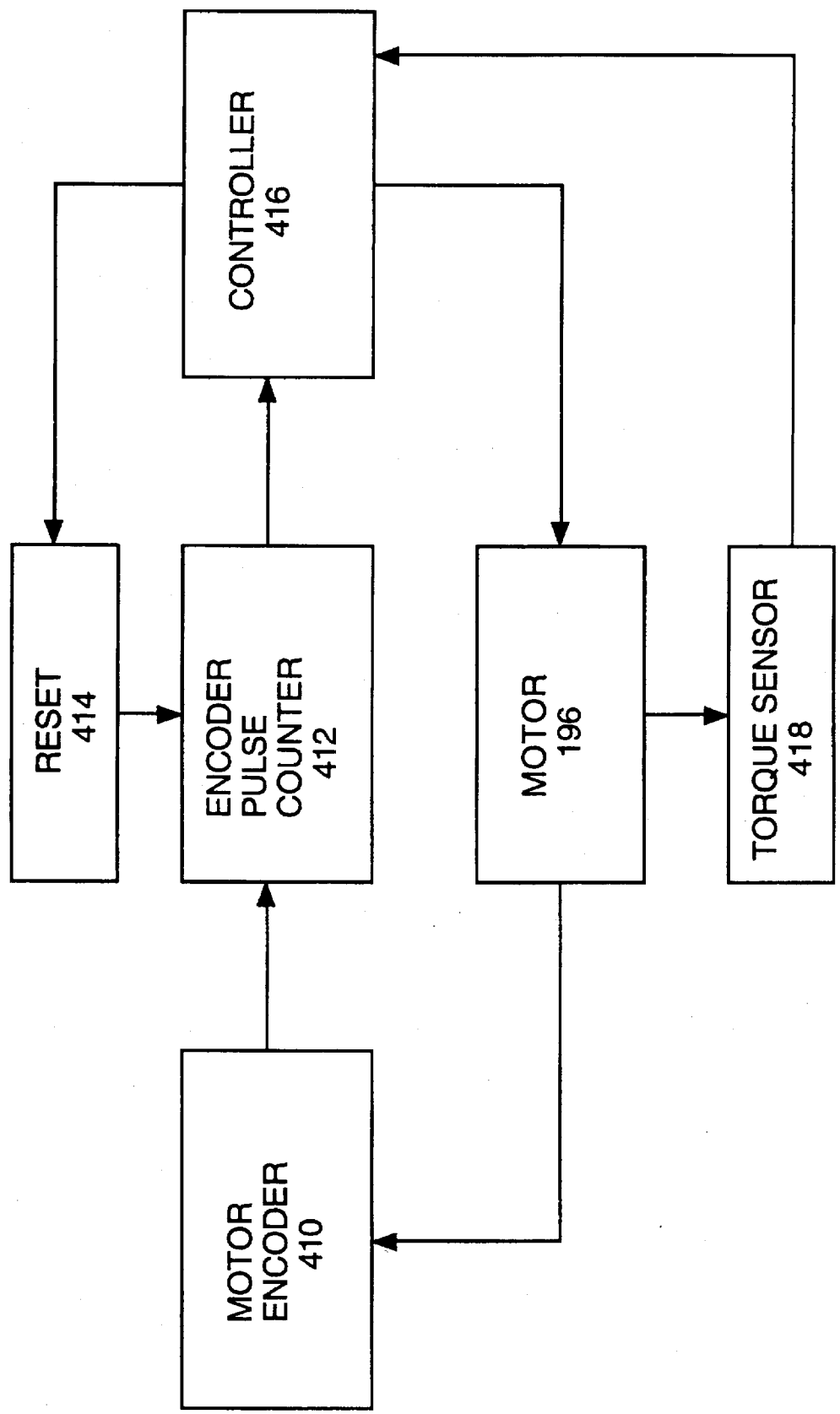
FIG. 20 is a block diagram illustrating components of a system for monitoring and calculating motor displacement.

A controller which may include software and/or hardware such as that described in U.S. Pat. No. 5,040,159 issued Aug. 13, 1991 for MECHANICAL SENSE OF TOUCH IN A CONTROL SYSTEM of Donald Stavely et al. (and corresponding EPO patent application No. 90302634.2 filed Mar. 13, 1990), which is hereby specifically incorporated by reference for all that it discloses, monitors the rotation of the drive shaft of motor 196 and the drive shafts of the other autochanger drive motors, as by counting motor encoder pulses, to determine the displacement of the various moving components of the autochanger, e.g., the longitudinal displacement of the media engager members 162, 164, the rotational displacement of media holder assembly 14, etc., from an initial location. Similarly, the controller stores values representative of drive motor shaft displacement from a known location in association with various physical reference points of the system, e.g., the number of vertical motor encoder pulses needed to raise the displacement assembly 80 from a bottom-most position to the height of each of the various media storage bags 60, 62 may be stored by the control system software. The controller is thus able to determine the instantaneous position and angular orientation of a cartridge 50 which is being transported by the autochanger and is also able to determine when a cartridge has reached its final destination, e.g. loaded in a media drive unit 68, through monitoring of motor shaft rotation. Such a controller and autochanger components associated with media holder drive motor 196 are shown schematically in FIG. 20.

Motor 196 has an operably connected motor encoder 410 which generates a pulse signal indicative of motor shaft angular displacement. This pulse signal is received by a pulse counter 412 which counts pulses occurring subsequent to a reset operation performed by reset unit 414. The pulse count from counter 412 is provided to controller 416 (which may be software in data processor 374). Motor 196 also has a torque sensor 418 connected thereto which provides a torque indicating signal to controller 416. Controller 416 sends command signals to control the angular displacement of the motor 196 drive shaft based upon the processing of the signals which it receives and stored position values. For this control system to operate accurately it is, of course, necessary to start the counting of encoder pulses from a known system position and orientation.

Autochanger 12 may employ the novel method of confirming the longitudinal position of each of the media engager members 162, 164 and the angular orientation of the media holder assembly 14 by monitoring and processing the signals of Hall-effect sensors 370, 371, as previously described in association with certain verification displacements of the media holder assembly.

In one preferred embodiment, the control system monitors the Hall-effect sensors only during predetermined "sensing windows".

Figure 21:
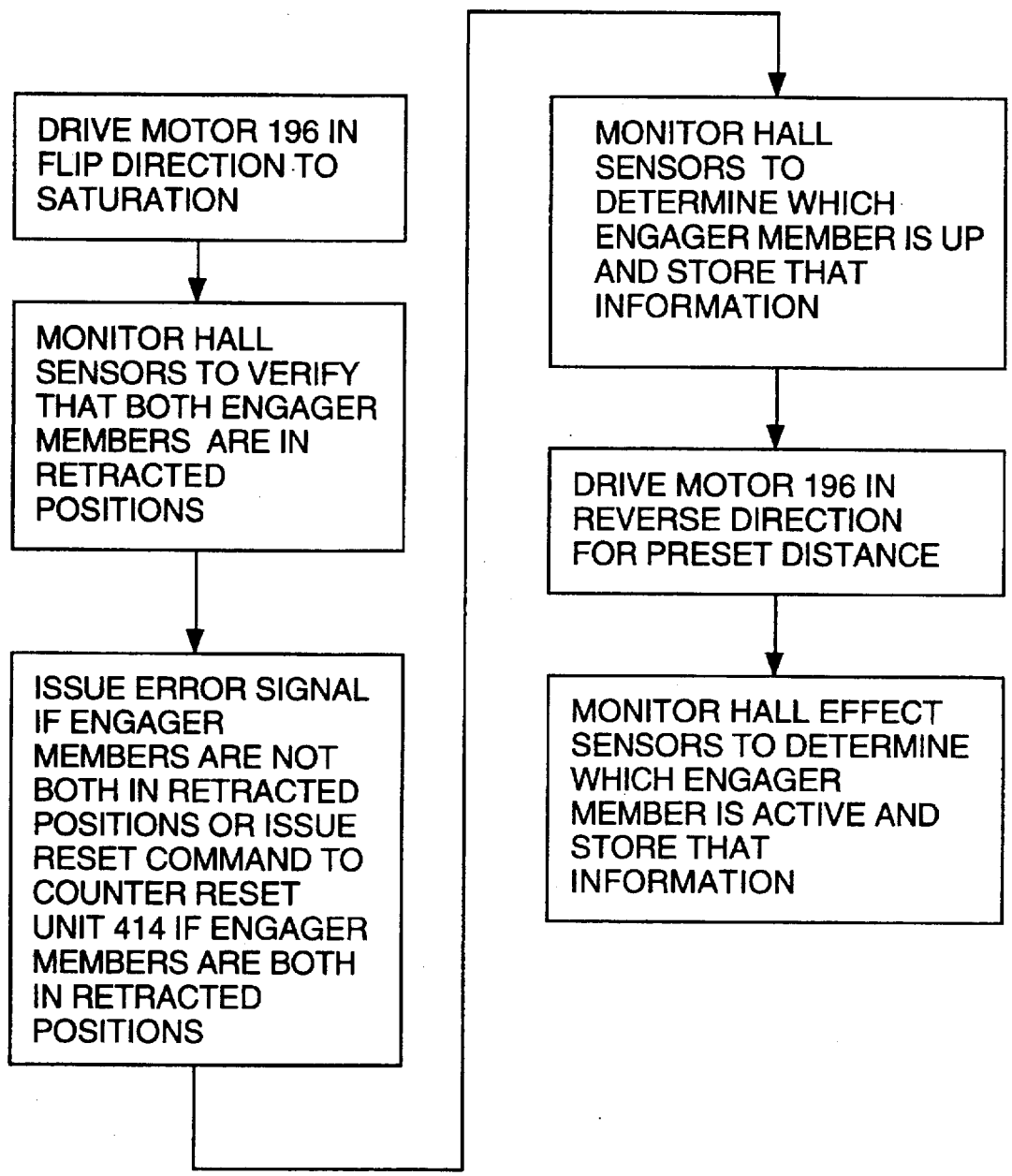
FIG. 21 is a flow chart illustrating a media holder position verification procedure.

One sensing window is at "power on", i.e., at initial system start-up. FIG. 21 illustrates the basic operations performed by controller 416 at power on verification. When the system is first switched on, drive motor 196 is rotated in the direction associated with the flip rotated direction 127 of the media holder assembly 14 until the motor reaches "saturation", i.e. until one of the media holder studs is engaged by the stud latcher assembly 30 causing termination of flipping rotation and the buildup of a sufficiently high rotation resisting torque (sensed by a motor torque sensor 418, FIG. 20) to cause motor controller 416 to terminate motor rotation. When the motor reaches saturation, the control system "assumes" that the media holder assembly 14 is in one of the two possible angular registration position with support frame 15, but does not have the information to determine which side of the media holder assembly (media engager 162 side or media engager 164 side) is up. The polarity reading from either one of the two Hall-effect sensors 370, 380 provides this piece of information. The polarity reading from both sensors may be used as a double check, i.e., if the upper Hall-effect sensor 370 senses a "north-pole closer" polarity (indicating that the engager member 162 side is up) the lower sensor 380 should sense a "south-pole closer" polarity (indicating that the engager member 154 side is down).

As previously mentioned, the absolute value of each Hall-effect sensor is indicative of the relative closeness of the magnet 350 or 351 on the associated engager member 162 or 164, with a signal magnitude over a predetermined value indicating that the associated engager member is in the retracted position. Thus, if the magnitude of each Hall-effect sensor signal is above the associated threshold, the controller determines that each engager member 162, 164 is in its retracted position. If based on the Hall-effect sensor signals, the controller determines each engager member 162, 164 is not in its retracted position at this point, then an error signal is issued by controller 416 and appropriate manual or automatic error recovery procedures may be undertaken.

Assuming that the analysis of signals of the Hall-effect sensors indicate that both media engager members 162, 164 are in the retracted position, the controller actuates reset unit 414 to reset the encoder pulse counter to zero. Next, it actuates the drive motor 196 to drive it for a short duration in the direction opposite to the direction which produces flipping motion 27. The transmission assembly of the autochanger is constructed and arranged such that this rotation of the motor in the counter direction after saturation in the flip direction will cause either the top engager member, e.g. 162, or the bottom engager member, e.g. 164 to be longitudinally displaced, depending upon the previous operating state of the transmission assembly (as fully explained in U.S. patent application, Ser. No. 08/135,067 incorporated by reference above). The duration of rotation in the counter direction is such as to produce a short, e.g. 10 mm, displacement of whichever engager member 162 or 164 is currently engaged with the transmission. Since the previous operating state of the transmission assembly may not be stored in the controller memory at start up, this displacement and sensor signal analysis provides the control system with a crucial piece of information, i.e., it tells the control system which of the engager members is active. The control system now "knows" that the media holder assembly 14 is in rotational registration with the support frame 16; it also "knows" which engager member 162 or 164 is positioned "up"; it also "knows which engager member 152 or 154 is active; and by counting the motor encoder pulses occurring during the short counter rotation after motor saturation in the flip direction, it also "knows" the exact position of the active media engager member 162 or 164. Thus, the controller now has the information which it needs to place either engager member 162 or 164 in any desired longitudinal position, and it also has the information which it needs to place the media holder assembly in the desired registration position with the support frame 16, i.e., either the registration position with engager member 162 up or the registration position with engager 164 up.

As a system check, the controller may perform the same general procedure described above after each flip during system operation. The completed flip corresponds to the motor saturation move described above, after which the controller verifies that both engagers 162, 164 are in the home position. Next, the controller 416 issues a command to reverse drive the motor a predetermined short distance to verify that the proper engager member 162 or 164 is active and the other engager is not active. If both verifications are positive, then the system continues normal operation; if either verification is not positive, then an error signal is issued and appropriate manual or automatic error recovery procedures may be implemented.

Hall-effect sensors, used in association with magnets, are the preferred sensors for use with the present invention because of their capacity for providing, in a single signal, information both as to the proximity and the identity of an adjacently positioned media engager member and also because of there compact configuration and relatively low cost. However it will be appreciated by those having skill in the art after reading the above disclosure that other sensor and indicia assemblies may be employed. For example rather than using magnets, different bar codes or other unique indicia could be provided on each media engaging member and bar code readers or other scanning devices and an associated data processor could be used to determine whether the indicia were positioned within a relevant field of view associated with linear registration of the media engagers and could also be used to read such indicia to determine the identity of the associated media engager.

It is contemplated that the inventive concepts herein described may be variously otherwise embodied and it is intended that the appended claims be construed to include alternative embodiments of the invention except insofar as limited by the prior art.

What is claimed is:

1. A monitor assembly for a media autochanger having a media holder assembly which is rotatable with respect to a media autochanger support frame about a media holder rotation axis, the media holder assembly including first and second media engaging members comprising:
    a) first indicia located on said first media engaging member;
    b) second indica located on said second media engaging member; and
    c) a first indicia sensor mounted on said support frame;
    wherein said media holder assembly has a first predetermined angular registration position relative said support frame and a second predetermined angular registration position relative said support frame and wherein said first and second media engaging members are each linearly displaceable along associated displacement axes between a retracted registration position and an extended position; said first and second indicia and said first indicia sensor being constructed and arranged such that said first indicia is sensed by said sensor only when said media holder assembly is in said first predetermined angular registration position and said first media engaging member is in said retracted registration position thereof.

2. The monitor assembly of claim 1 said first and second indicia and said first indicia sensor being constructed and arranged such that said second indicia is sensed by said sensor when said media holder assembly is in said second predetermined angular registration position and said second media engaging member is in said retracted registration position thereof.

3. The monitor assembly of claim 2, further comprising a second indicia sensor mounted on said support frame, said first and second indicia and said second indicia sensor being constructed and arranged such that said second indicia is sensed by said second sensor when said media holder assembly is in said first predetermined angular registration position and said second media engaging member is in said second retracted registration position thereof.

4. The monitor assembly of claim 3, said indicia and said second indicia sensor being constructed and arranged such that said first indicia is sensed by said second sensor when said media holder assembly is in said second predetermined angular registration position and said first media engaging member is in said retracted registration position thereof.

5. The monitor assembly of claim 1, said first indicia sensor producing distinguishably different sensor signals when positioned in the proximity of said first indicia and said second indicia, respectively.

6. The monitor assembly of claim 3, said first indicia sensor and said second indicia sensor each producing distinguishably different sensor signals when positioned in the proximity of said first indicia and said second indicia, respectively.

7. The monitor assembly of claim 1, wherein said first and second indicia comprise first and second magnets, respectively and wherein said first indicia sensor comprises a Hall effect sensor.

8. The monitor assembly of claim 7 wherein said first and second magnets have different polar orientations when positioned proximate said first indicia sensor through rotation of said media holder assembly.

9. A method of determining the orientation of certain components of a media autochanger having a media holder assembly which is rotatable with respect to a support frame about a media holder rotation axis, the media holder assembly including first and second media engaging members, comprising the steps of:
    at a predetermined position on the support frame sensing the polarity of a magnet mounted on an adjacently positioned one of said media engaging members; and
    determining which of said media engaging members is said adjacently positioned one based upon said sensed polarity.

10. The method of claim 9 comprising the further steps of:
    at said predetermined position on the support frame sensing the local strength of the magnetic field originating from said magnet mounted on said adjacent one of said media engaging members; and
    based upon the sensed magnetic field strength determining whether said adjacent one of said media engaging members is in a predetermined linear registration position.

11. A monitor assembly for a media autochanger having a media holder assembly which is rotatable with respect to a media autochanger support frame about a media holder rotation axis, the media holder assembly including first and second linearly displaceable media engaging members:
    a) first indicia located on said first media engaging member;
    b) second indica located on said second media engaging member;
    c) a first indicia sensor mounted on said support frame and generating a signal based upon the sensing of said indicia; and
    d) a data processor operably connected to said first indicia sensor for receiving and processing said signal for detecting a predetermined rotational position of said media holder assembly about said rotation axis and predetermined linear positions of said displaceable media engaging members.

* * * * *